US009131122B2

(12) United States Patent
Oya et al.

(10) Patent No.: US 9,131,122 B2
(45) Date of Patent: Sep. 8, 2015

(54) APPARATUS, METHOD, SYSTEM, AND STORAGE MEDIUM CAUSING A DISPLAY TO DISPLAY A GRAPH INDICATING A DEGREE OF CHANGE OF PART OF A CAPTURED IMAGE

(71) Applicant: CANON KABUSHIKI KAISHA, Tokyo (JP)

(72) Inventors: Takashi Oya, Kanagawa (JP); Toshihiko Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/153,144

(22) Filed: Jan. 13, 2014

(65) Prior Publication Data

US 2014/0125834 A1     May 8, 2014

Related U.S. Application Data

(60) Continuation of application No. 12/830,485, filed on Jul. 6, 2010, now Pat. No. 8,654,199, which is a continuation of application No. 11/843,311, filed on Aug. 22, 2007, now Pat. No. 7,777,780, which is a division of application No. 10/932,001, filed on Sep. 2, 2004, now Pat. No. 7,280,753.

(30) Foreign Application Priority Data

| Sep. 3, 2003 | (JP) | 2003-311340 |
|---|---|---|
| Oct. 30, 2003 | (JP) | 2003-371039 |
| Dec. 12, 2003 | (JP) | 2003-415428 |
| May 11, 2004 | (JP) | 2004-141239 |

(51) Int. Cl.
*H04N 7/18*     (2006.01)
*G08B 13/196*     (2006.01)
(Continued)

(52) U.S. Cl.
CPC .. *H04N 7/18* (2013.01); *G06T 7/20* (2013.01); *G08B 13/1968* (2013.01);
(Continued)

(58) Field of Classification Search
CPC .................................................. H04N 5/23293
USPC ............... 348/152–154, 169, 208.01–208.04, 348/222.1
See application file for complete search history.

(56) References Cited

U.S. PATENT DOCUMENTS

| 5,721,692 A | 2/1998 | Nagaya et al. |
|---|---|---|
| 5,757,668 A | 5/1998 | Zhu |

(Continued)

FOREIGN PATENT DOCUMENTS

| JP | 62-86990 A | 4/1987 |
|---|---|---|
| JP | 4-352286 | 12/1992 |

(Continued)

OTHER PUBLICATIONS

Japanese Office Action dated Jan. 31, 2012, in counterpart Japanese Application No. 2009-240866.
(Continued)

*Primary Examiner* — Gevell Selby
(74) *Attorney, Agent, or Firm* — Fitzpatrick, Cella, Harper & Scinto

(57) ABSTRACT

In a display apparatus connected to an image processing apparatus which detects the change amount in an input image and stores, as a detected image, an image during a period with a change amount equal to or more than a predetermined amount, the change log of the change amount and the detected image are received, the change log is displayed by using a graph, and information related to the detected image is displayed on the graph in a superposed manner.

20 Claims, 31 Drawing Sheets

(51) Int. Cl.
*G11B 27/034* (2006.01)
*G11B 27/10* (2006.01)
*G11B 27/28* (2006.01)
*G11B 27/30* (2006.01)
*G11B 27/34* (2006.01)
*H04N 5/76* (2006.01)
*G06T 7/20* (2006.01)
*H04N 5/765* (2006.01)
*H04N 5/77* (2006.01)
*H04N 5/775* (2006.01)
*H04N 9/804* (2006.01)

(52) U.S. Cl.
CPC ... *G08B 13/19602* (2013.01); *G08B 13/19604* (2013.01); *G08B 13/19667* (2013.01); *G08B 13/19669* (2013.01); *G08B 13/19671* (2013.01); *G08B 13/19676* (2013.01); *G08B 13/19682* (2013.01); *G08B 13/19691* (2013.01); *G11B 27/034* (2013.01); *G11B 27/105* (2013.01); *G11B 27/28* (2013.01); *G11B 27/3045* (2013.01); *G11B 27/34* (2013.01); *H04N 5/76* (2013.01); *H04N 7/181* (2013.01); *H04N 5/765* (2013.01); *H04N 5/77* (2013.01); *H04N 5/775* (2013.01); *H04N 9/8042* (2013.01); *H04N 9/8047* (2013.01)

(56) References Cited

U.S. PATENT DOCUMENTS

| | | | |
|---|---|---|---|
| 5,862,508 A | 1/1999 | Nagaya et al. | |
| 6,122,446 A * | 9/2000 | Satoh | 396/52 |
| 6,226,459 B1 * | 5/2001 | Hamada et al. | 396/54 |
| 6,411,771 B1 | 6/2002 | Aotake | |
| 6,741,977 B1 | 5/2004 | Nagaya et al. | |
| 7,375,762 B2 | 5/2008 | Mishima et al. | |
| 2002/0030739 A1 | 3/2002 | Nagaya et al. | |
| 2003/0043292 A1 | 3/2003 | Pyle et al. | |
| 2004/0119819 A1 | 6/2004 | Aggarwal et al. | |
| 2004/0190607 A1 * | 9/2004 | Wakimoto et al. | 375/240.01 |
| 2004/0233286 A1 | 11/2004 | Kawabe et al. | |
| 2005/0163220 A1 | 7/2005 | Takakura et al. | |
| 2005/0213793 A1 | 9/2005 | Oya et al. | |
| 2006/0159370 A1 * | 7/2006 | Tanaka et al. | 382/305 |
| 2010/0002133 A1 | 1/2010 | Ueno et al. | |

FOREIGN PATENT DOCUMENTS

| | | |
|---|---|---|
| JP | 8-221577 | 8/1996 |
| JP | 8-297792 | 11/1996 |
| JP | 9-018828 A | 1/1997 |
| JP | 9-65287 | 3/1997 |
| JP | 9-200768 | 7/1997 |
| JP | 10-98675 | 4/1998 |
| JP | 10-108166 | 4/1998 |
| JP | 11-32301 | 2/1999 |
| JP | 2000-224542 | 8/2000 |
| JP | 2002-312790 A | 10/2002 |
| JP | 2003-169319 | 6/2003 |

OTHER PUBLICATIONS

Japanese Official Communication dated Oct. 9, 2009, regarding Application No. 2003-311340.
Japanese Official Communication dated Aug. 18, 2009, regarding Application No. 2004-141239.

* cited by examiner

F I G. 19
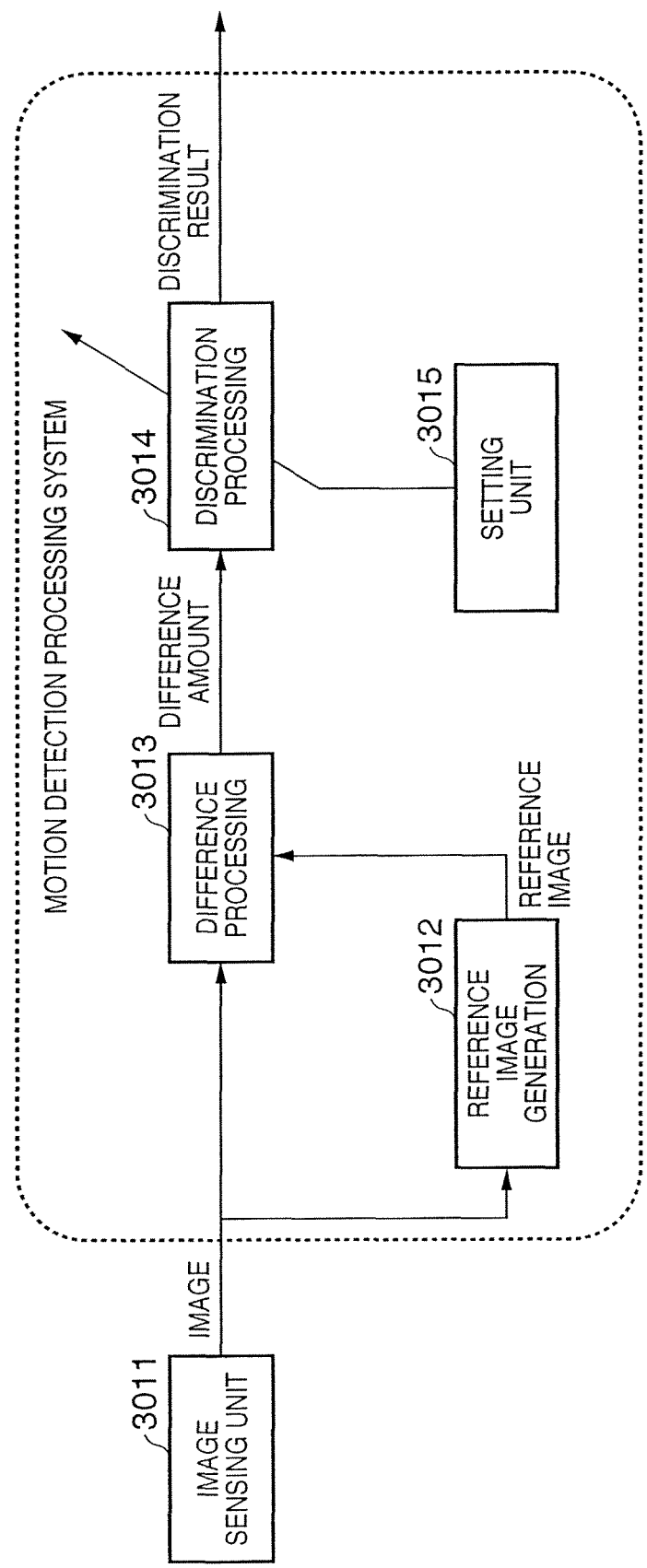

F I G. 22A
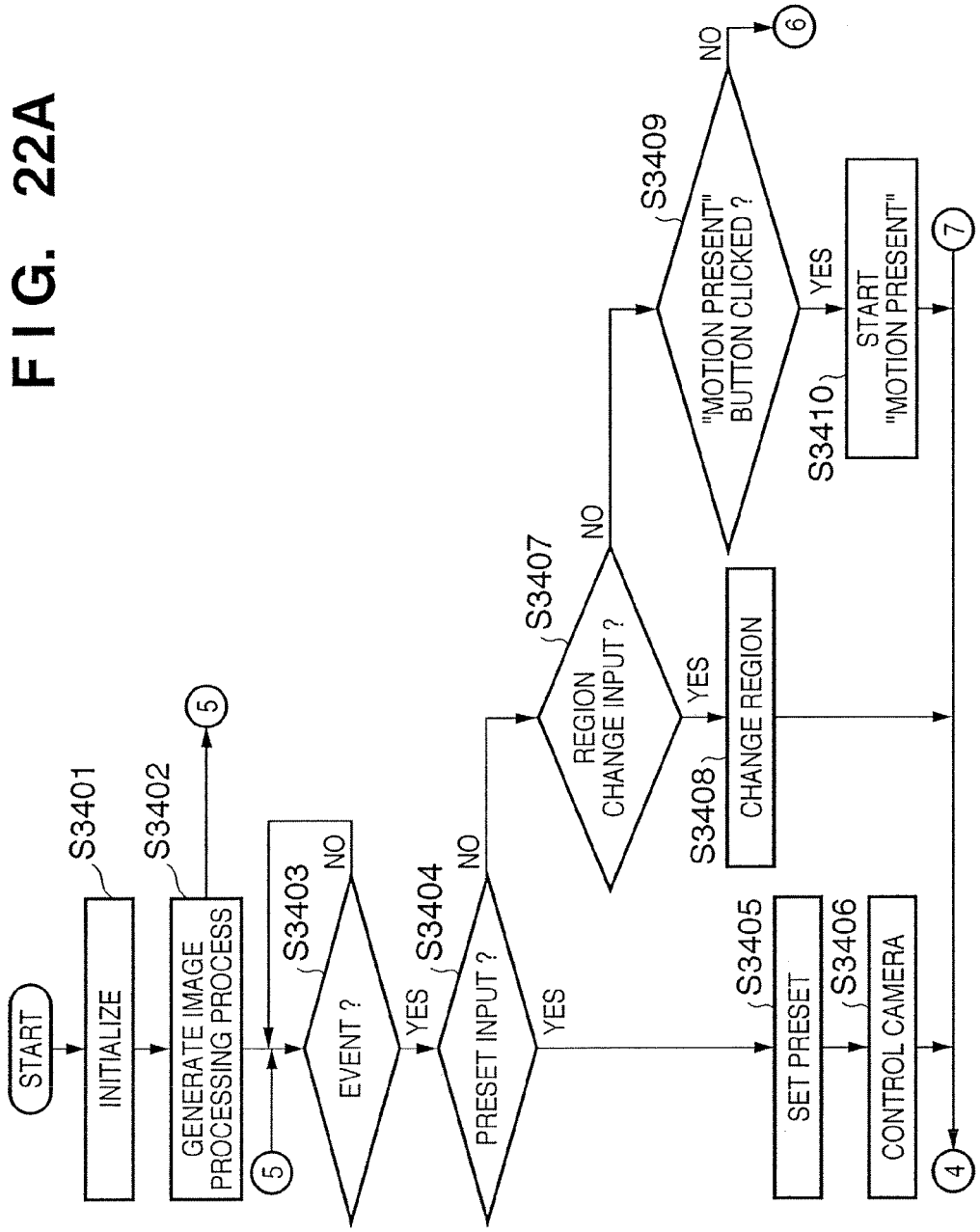

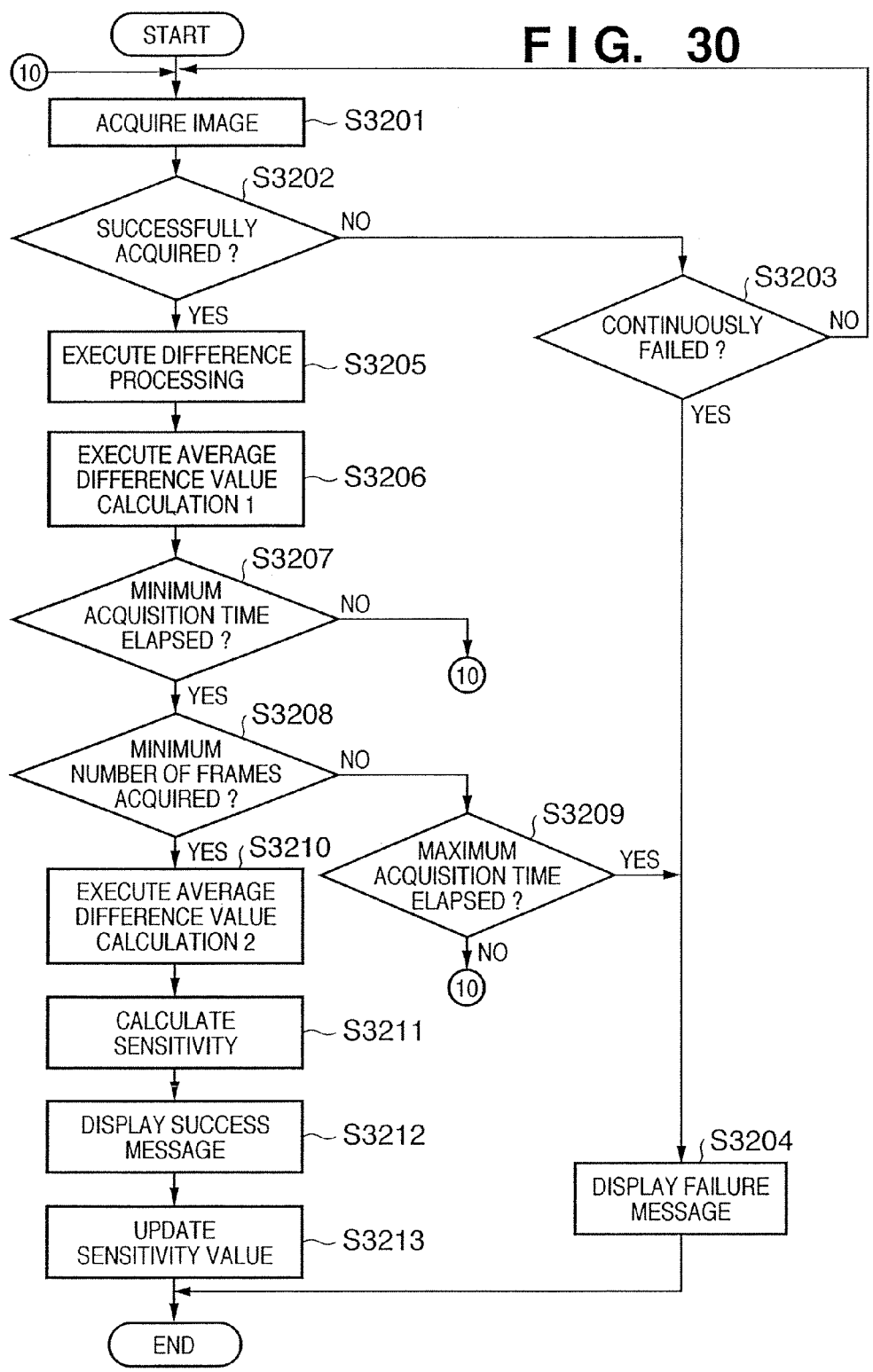

APPARATUS, METHOD, SYSTEM, AND STORAGE MEDIUM CAUSING A DISPLAY TO DISPLAY A GRAPH INDICATING A DEGREE OF CHANGE OF PART OF A CAPTURED IMAGE

This is a continuation of U.S. patent application Ser. No. 12/830,485 filed on Jul. 6, 2010, pending, which is a continuation of U.S. patent application Ser. No. 11/843,311 filed Aug. 22, 2007, now issued as U.S. Pat. No. 7,777,780 on Aug. 17, 2010, which is divisional of U.S. patent application Ser. No. 10/932,001 filed Sep. 2, 2004, now issued as U.S. Pat. No. 7,280,753 on Oct. 9, 2007.

FIELD OF THE INVENTION

The present invention relates to a display apparatus, image processing apparatus, and image processing system and, more particularly, to a technique for storing an image when an image change amount not less than a predetermined amount is detected in a monitoring system or camera server.

The present invention also relates to an image processing apparatus and method for an image photographed by a camera and, more particularly, to setting of motion detection sensitivity.

The present invention also relates to an image motion detection method and apparatus for detecting motion of a moving image, and a program and storage medium thereof.

BACKGROUND OF THE INVENTION

In monitoring systems which photograph a moving image by using a camera, a technique for automatically detecting a change (scene change) in a photographed moving image by image processing and saving/accumulating (storing) the image when the change is detected has been put into practical use.

In such systems, generally, a plurality of images which are photographed and accumulated when changes are detected are laid out and displayed in the chronological order together with the photography times.

In addition, a function of browsing live images or images photographed at the time of change detection via a network and executing various kinds of setting including parameters of change detection from a remote site has also been put into practical use.

On the other hand, in a video editing system, a change in scene is detected by image processing, and the scene change time and an image at that time are visually displayed on an editing window.

For example, Japanese Patent Laid-Open No. 11-32301 discloses an image processing apparatus including a GUI (Graphical User Interface) which automatically executes cut detection in video editing software and displays the start image of the same scene.

Japanese Patent Laid-Open No. 9-65287 discloses a moving image feature scene detection apparatus which obtains the same scene on the basis of the color tone, speaker, subtitle, and the like and displays the representative image in the scene.

In the above-described monitoring systems, images at the time of change detection can be displayed in a list in the time-series order. However, the magnitude of the change amount between the images is unknown.

On the other hand, in the video editing systems disclosed in the two patent references, the change time and the first scene or representative image by cut detection are displayed. In this case as well, the magnitude of the change amount between the images is unknown.

If the magnitude of the change amount between the displayed images is unknown, as described above, it is difficult to find the portion with the largest change amount from accumulated images.

In the above-described systems, the parameters may be changed such that only images with large change amounts are accumulated and displayed. In this case, however, an image whose change amount is smaller than the threshold value is not accumulated. Hence, it may be impossible at a high probability to see desired images after image accumulation.

In monitoring systems and, more particularly, monitoring systems which can execute remote monitoring using computer networks, a function called motion detection, change detection, or dynamic detection is essential. These detection functions will be referred to as "motion detection" hereinafter (e.g., Japanese Patent Laid-Open No. 08-297792).

In "motion detection", a change in image between frames or the motion of an object in image between frames sensed by a video camera is detected by image processing. The user is notified of the detection result on a display device or through an output device such as a loudspeaker.

In use of the motion detection function, it is important to determine the threshold value (sensitivity setting) to set the degree of change in image between frames or the degree of motion of the object in image between frames, which is the criterion for notification to the user. If the detection sensitivity is too low, no invaders can be detected. Conversely, if the sensitivity setting is too high, notification takes place even when it is unnecessary.

In some of the conventional systems, sensitivity setting is so easy that one of several preset levels from low to high sensitivity is selected. Alternatively, it is necessary to designate various parameters as numerical values.

In systems of former type, optimum setting is not always possible in actual operation. In systems of latter type, intuitive setting is impossible, and designation of appropriate set values is difficult in itself.

As described above, in the monitoring systems, the function of automatically obtaining a change in monitoring image by image processing and, upon detecting a change, notifying the user of it or saving/accumulating the image has been put into practical use. Some systems have a function of displaying an image change amount during the progress of motion detection processing and interactively adjusting the sensitivity to set the motion detection sensitivity.

For example, a system in which the user can adjust the detection parameter while observing an indicator that indicates the image change amount is known. In addition, Japanese Patent Laid-Open Nos. 11-032301 and 9-65287 disclose video editing systems which have a function of obtaining a scene change by image processing and visually displaying the scene change time and the image at that time on an editing window.

On the other hand, Japanese Patent Laid-Open No. 9-200768 discloses a method of detecting the motion of an image on the basis of the background difference or interframe difference. In this method, an image with a motion and an image without any motion are input to set an optimum sensitivity that should prevent any detection error or detection miss.

With the conventional moving image motion detection function, the detection sensitivity can be set. However, the range of actually settable values is often wide, and the detection sensitivity must be adjusted by trial and error. The video editing systems have the function of displaying the scene start image or representative image by cut detection. However, they have no detection intensity adjustment function in general. In the invention disclosed in Japanese Patent Laid-Open No. 9-200768, an appropriate sensitivity range is presented on the basis of an image with a motion and an image without any motion, thereby reducing the load on the user in setting the sensitivity. However, patent reference 3 discloses no specific interface for input by the user.

SUMMARY OF THE INVENTION

It is the first object of the present invention to make it possible to display time progress of the change amount in an image and display an image when a change equal to or more than a predetermined amount is detected in association with the time progress of the change amount.

A display apparatus according to one aspect of the present invention, which achieves the first object, is a display apparatus which is connected to an image processing apparatus which detects a change amount in an input image and stores, as a detected image, an image obtained during a period with a change amount not less than a predetermined amount, comprising: a reception device which receives a change log of the change amount and the detected image, wherein the change log is displayed by using a graph, and information related to the detected image is displayed on the graph in a superposed manner.

An image processing apparatus according to another aspect of the present invention, which achieves the first object, is an image processing apparatus comprising: an encoding device which encodes input image data at a predetermined time interval; a change detection device which detects on the basis of a difference between the image data at the time interval whether a change amount in image data exceeds a predetermined amount; and a storage device which stores a change log representing time progress of the change amount and, when the detection device detects that the change amount exceeds the predetermined amount, stores corresponding encoded image data as a detected image.

More specifically, in the present invention, in a display apparatus connected to an image processing apparatus which detects the change amount in an input image and stores, as a detected image, an image during a period with a change amount equal to or more than a predetermined amount, the change log (history) of the change amount and the detected image are received, the change log is displayed by using a graph, and information related to the detected image is displayed on the graph in a superposed manner.

Accordingly, the time progress of a change amount in image data during a predetermined period can be displayed by using, e.g., a graph, and information related to a detected image can be displayed in association with the graph. The time progress of image data can be displayed in a visually convenient form, and a desired detected image can easily be displayed.

Further, the first object of the present invention is also achieved by a display apparatus which is connected to an image processing apparatus and displays a change log and a detected image, the image processing apparatus comprising an encoding device which encodes input image data at a predetermined time interval, a change detection device which detects on the basis of a difference between the image data at the time interval whether a change amount in image data exceeds a predetermined amount, and a storage device which stores the change log representing time progress of the change amount and, when the detection device detects that the change amount exceeds the predetermined amount, stores corresponding encoded image data as the detected image, comprising: a decoding device which decodes the encoded image data; and a display device which displays the change log by using a graph and displays information related to the detected image on the graph in a superposed manner.

Moreover, the first object of the present invention is also achieved by a display apparatus which is connected to an image processing apparatus and displays a change log and a detected image, the image processing apparatus comprising an encoding device which encodes input image data at a predetermined time interval, a change detection device which detects on the basis of a difference between the image data at the time interval whether a change amount in image data exceeds a predetermined amount, and a storage device which stores the change log representing time progress of the change amount and, when the detection device detects that the change amount exceeds the predetermined amount, stores corresponding encoded image data as the detected image, the change detection device detecting the change amount in each of a plurality of preset regions of the image data, and the storage device storing the change log and the detected image for each region, comprising: a decoding device which decodes the encoded image data; an operation device which is operated by a user to input one of a selection and an instruction; and a display device which displays the change log by using a graph for one of the plurality of regions, which is selected by the operation device, and displays information related to the detected image for each of the plurality of regions on the graph in a superposed manner.

The above object is also achieved by a display method and image processing method corresponding to the display apparatus and image processing apparatus, a program which implements these methods on a computer apparatus, and a storage medium which stores the program.

It is the second object of the present invention to provide a technique for easily setting a suitable set value which should be used to notify a user that a change between frame images is equal to or more than a predetermined value.

An image processing apparatus according to the present invention, which achieves the second object, is an image processing apparatus which obtains a set value to execute notification processing when a difference between frame images contained in a moving image is not less than the set value, comprising: an average image generation device which divides the frames into groups each including a predetermined number of frames and executes, for each group, processing for generating an average image of the frame images in the group; a designation device which designates a start frame and an end frame of the frames; a first calculation device which obtains a maximum difference value and a minimum difference value of differences between the frame images from the start frame to the end frame and an image obtained by the average image generation device for a group including the start frame; a second calculation device which obtains a maximum difference value and a minimum difference value of differences between the frame images from the start frame to the end frame and an image obtained by the average image generation device for a group including the end frame; and a determination device which determines the set value by using a larger one of the maximum difference values calculated by the first calculation device and the second calculation device and a smaller one of the minimum difference values calculated by the first calculation device and the second calculation device.

Another image processing apparatus according to the present invention, which achieves the second object, is an image processing apparatus which obtains a set value to execute notification processing when a difference between frame images contained in a moving image is not less than the set value, comprising: a first average image generation device which divides the frames into groups each including a predetermined number of frames and executes, for each group, processing for generating an average image of the frame images in the group; a designation device which designates a start frame and an end frame of the frames; a second average image generation device which generates an average image of an image obtained by the first average image generation device for a group including the start frame and an image obtained by the first average image generation device for a group including the end frame; a first specifying device which specifies a maximum difference value of differences between the frame images from the start frame to the end frame and the image generated by the second average image generation device; a second specifying device which specifies a minimum difference value of differences between the frame images from the start frame to the end frame and the image generated by the second average image generation device; and a determination device which determines the set value by using the difference value specified by the first specifying device and the difference value specified by the second specifying device.

According to the above arrangement, a set value which should be used to notify a user that a change between frame images is equal to or more than a predetermined value can easily be set to a suitable value.

The above object is also achieved by an image processing method corresponding to the image processing apparatus, a program which implements the method on a computer apparatus, and a storage medium which stores the program.

It is the third object of the present invention to make it possible to designate a period in which motion is present in a moving image and a period in which no motion is present by user operation in obtaining a threshold value setting range useful for appropriate sensitivity adjustment from these periods.

An image motion detection apparatus according to the present invention, which achieves the third object, is an image motion detection apparatus comprising: an image display device which displays a moving image; a period designation device which designates, in accordance with user operation, a first period in which motion is present in the moving image displayed by the image display device and a second period in which no motion is present; an upper/lower limit value determination device which determines an upper limit value and a lower limit value of a threshold value on the basis of a change amount in the moving image during the first period with respect to a predetermined reference image and a change amount in the moving image during the second period with respect to the predetermined reference image; a threshold value determination device which determines an arbitrary threshold value in accordance with user operation within a range from the upper limit value to the lower limit value of the threshold value, which are determined by the upper/lower limit value determination device; and a motion detection device which detects motion in the moving image on the basis of the threshold value determined by the threshold value determination device and the change amount in the moving image with respect to the predetermined reference image.

Another image motion detection apparatus according to the present invention, which achieves the third object, is an image motion detection apparatus comprising: an image display device which displays a moving image; a start instruction device which instructs a start of automatic setting of sensitivity; and a threshold value determination device which obtains, on the basis of a plurality of frames, a change amount in the moving image with respect to a predetermined reference image in a state in which the image is assumed to have no motion in response to the instruction of automatic setting by the start instruction device and determines a threshold value for motion detection from the obtained change amount.

According to the above arrangement, a first period in which motion is present in a moving image and a second period in which no motion is present are designated in accordance with user operation, and the upper and lower limit values of a threshold value are determined on the basis of a change amount in the moving image during the first period with respect to a predetermined reference image and a change amount in the moving image during the second period with respect to the predetermined reference image. Hence, when obtaining a threshold value setting range useful for appropriate sensitivity adjustment from a period in which motion is present in a moving image and a period in which no motion is present, these periods can be designated by user operation.

In addition, a start of automatic setting of sensitivity is instructed, a change amount in a moving image with respect to a predetermined reference image is photographed for a plurality of frames after the instruction of automatic setting start assuming that no motion is present in the image, and a threshold value for motion detection is determined from the obtained change amount. Hence, a threshold value useful for appropriate sensitivity adjustment can automatically be set by only simple user operation.

The above object is also achieved by an image motion detection method corresponding to the image motion detection apparatus, a program which implements the method on a computer apparatus, and a storage medium which stores the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a view for explaining the outline of motion detection processing by a difference;

FIGS. 22A and 22B are flowcharts showing the operation procedures of a motion detection setting program according to the eighth embodiment of the present invention;

FIG. 30 is a flowchart showing the operation procedures of a motion detection setting program according to the 11th embodiment of the present invention.

DETAILED DESCRIPTION OF THE PREFERRED EMBODIMENTS

Preferred embodiments of the present invention will now be described in detail in accordance with the accompanying drawings.

In this specification, "accumulate" is used in the same sense as "store" or "save" and means that information is stored in a playback enable state.

First Embodiment

In the first embodiment, an image change detection system will be described, in which a change in photographed image is detected in a camera server, and a graph representing a time-series change in consequently accumulated change detection amount and the image at the time of change detection are displayed on the screen of an image change detection setting client (to be simply referred to as a setting client hereinafter).

Figure 1:
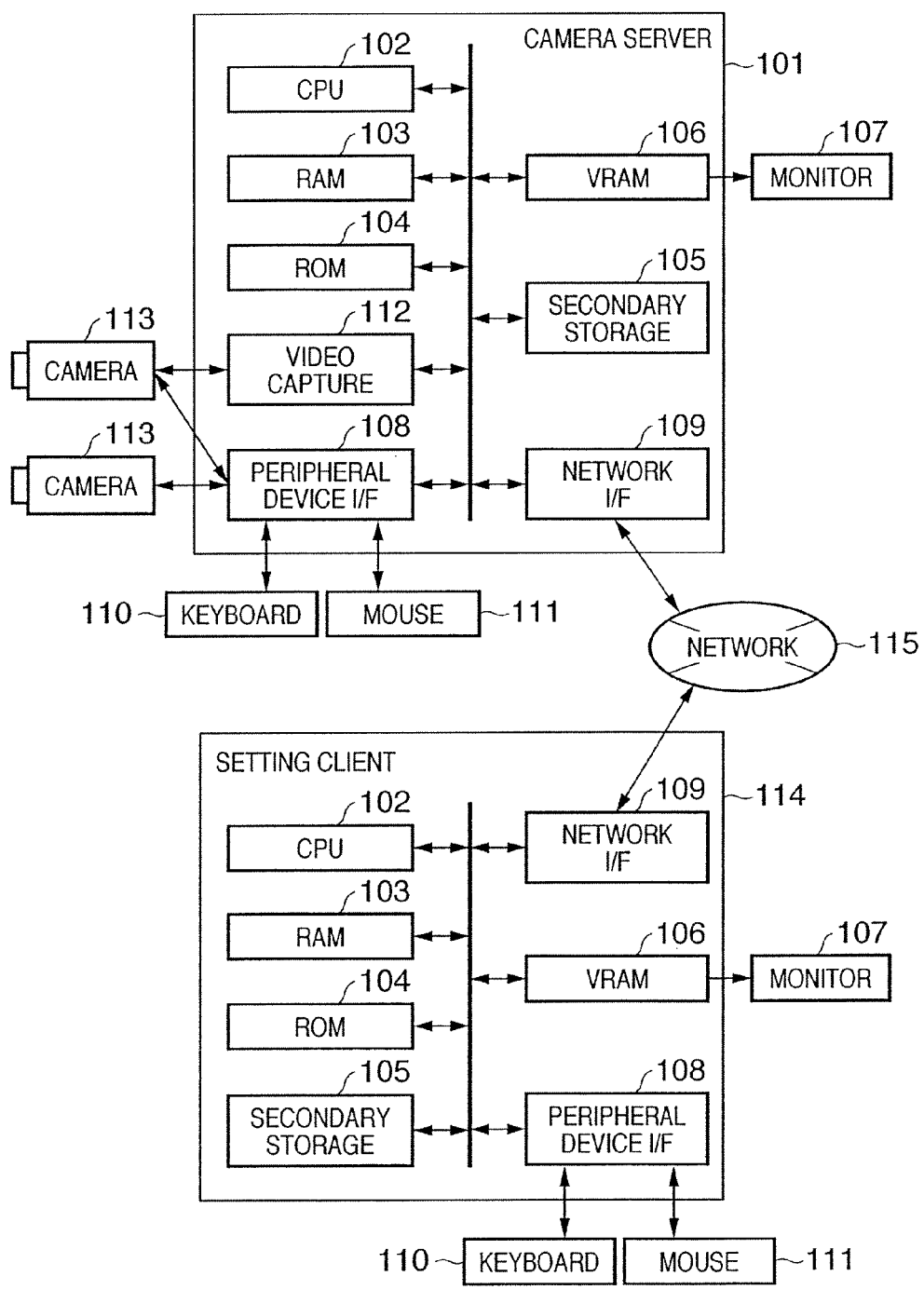
FIG. 1 is a block diagram showing the hardware configuration of an image change detection system according to the first embodiment.

FIG. 1 is a block diagram showing the hardware configuration of the image change detection system according to this embodiment. The image change detection system according to this embodiment includes a camera server 101 and a setting client 114, which are connected through a network 115.

The camera server 101 acquires an image photographed by a camera 113 and transmits the image to the setting client 114 through the network 115. In addition, image change detection processing is executed in the camera server and accumulates the image at the time of change detection and the log (history) of change detection amounts. The camera 113 may photograph either a still image or a moving image.

Software which displays a received video image, software which sets the change detection function, and software which displays the change log and the image accumulated at the time of change detection run on the setting client 114. The setting client 114 transmits a set value set by the setting software to the camera server 101. The camera server 101 receives the set value, and from this time, executes change detection processing on the basis of the set value.

The camera server 101 comprises a CPU 102, RAM 103, ROM 104, and secondary storage device 105. The camera server 101 also comprises a video RAM (VRAM) 106 for screen display. A monitor 107 is connected to the camera server 101. The camera server 101 comprises a peripheral device interface 108 to connect peripheral devices. The peripheral device interface 108 is connected to a keyboard 110 to be operated by the user, a pointing device 111 such a mouse, and a camera 113 with or without a pan head. The camera 113 is connected to the peripheral device interface 108 which transmits/receives a digital signal or a video capture card 112 which receives a video signal. The camera server 101 also comprises a network interface 109 for connection to the network 115. As the standard of the peripheral device interface 108, various standards such as PS/2, RS-232C, USB, and IEEE1394 are present. However, this embodiment does not depend on these standards.

The CPU 102, RAM 103, ROM 104, secondary storage device 105, VRAM 106, peripheral device interface 108, network interface 109, and video capture card 112 are connected to the internal bus.

The above-described arrangement of the camera server 101 can easily be implemented by using a commercially available personal computer and camera. The server main body can also be operated from an external device through the network. Hence, a so-called set-top box structure having none of the VRAM 106, monitor 107, keyboard 110, and mouse 111 can also be employed without any problem.

The setting client 114 also has almost the same arrangement as the camera server 101 except input devices connected. More specifically, the setting client 114 includes the CPU 102, RAM 103, ROM 104, secondary storage device 105, VRAM 106, monitor 107, peripheral device interface 108, network interface 109, keyboard 110, and pointing device (mouse) 111.

The setting client 114 can also easily be implemented by using a commercially available personal computer. The already described software programs which execute video display, change detection setting, and change log display are stored in the secondary storage device 105. A GUI is displayed on the monitor 107 by application software so that the user interactively executes the operation by using the keyboard 110 and mouse 111.

The setting client 114 acquires an image from the camera server 101 in the following way. For example, when a URL-encoded command is transmitted by HTTP, images corresponding to a plurality of frames are returned. This scheme is a known technique used by a network camera on the market.

In this embodiment, the Internet based on the IP protocol is assumed as the network 115. However, the implementation scheme is not limited, and any other transmission path which can transmit/receive a digital signal and has a sufficient capacity for image communication can be used.

Examples of the functional blocks of the camera server will be described next with reference to FIG. 2. Only parts related to image processing will be described with reference to FIG. 2, and a description of parts related to camera control and system control will be omitted.

Figure 2:
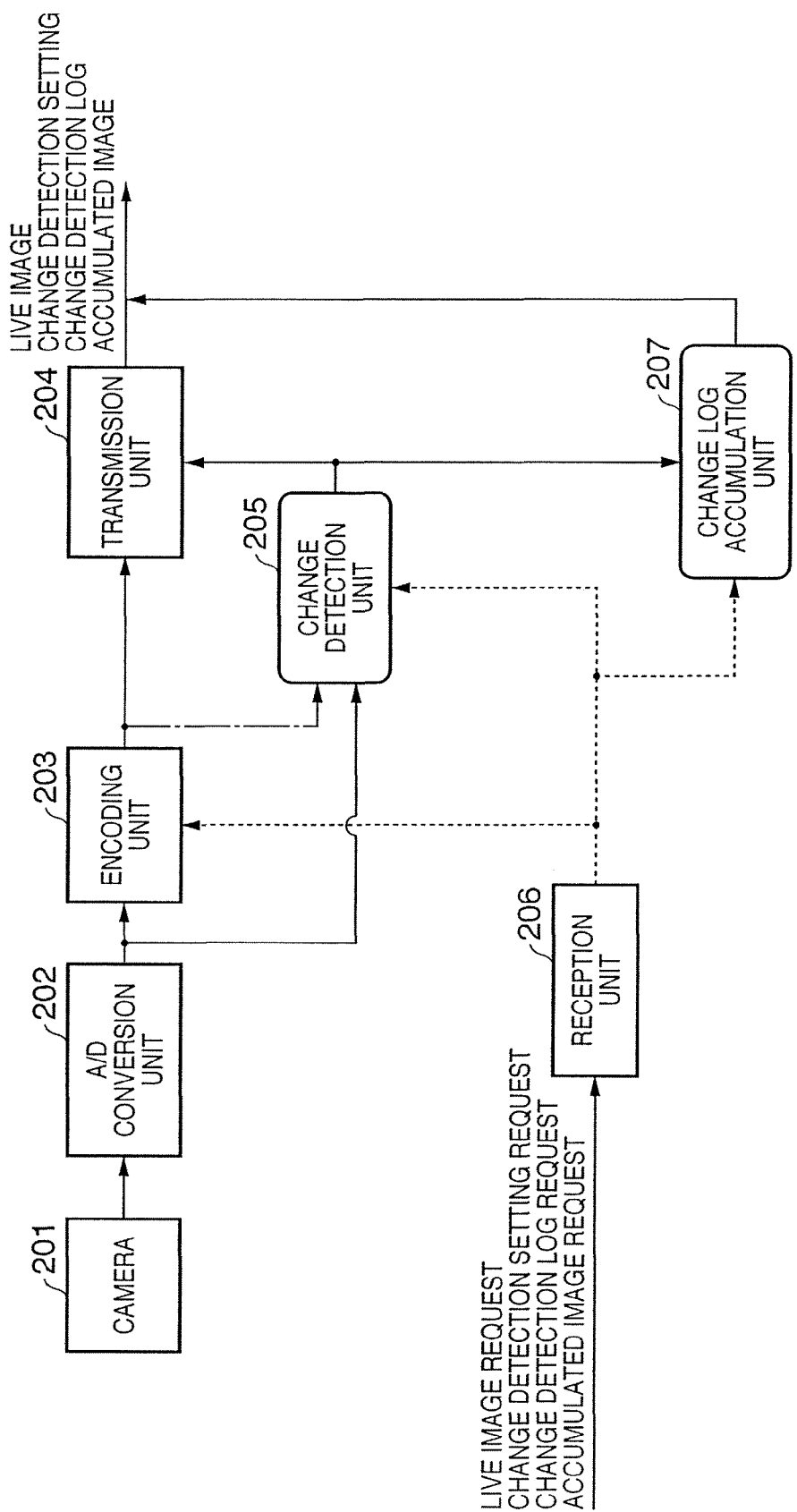
FIG. 2 is a functional block diagram of a camera server shown in FIG. 1.

Referring to FIG. 2, an image signal input from a camera 201 is converted into a digital signal by an A/D conversion unit 202 and encoded by an encoding unit 203. JPEG or MPEG is used as the encoding scheme. However, this embodiment does not depend on the encoding scheme. Next, a change detection unit 205 executes change detection processing of the image. The change amount log and the accumulated image at the time of change detection by the change detection unit 205 are saved and managed by a change log accumulation unit 207. The encoded image, the change detection processing result, the change log, and the accumulated image at the time of change detection are transmitted from a transmission unit 204 in response to a request from the setting client. A reception unit 206 receives encoding or change detection settings, a live image request, a change log request, or an accumulated image request transmitted from the setting client.

A change detection processing scheme using the inter-frame difference or background difference is known. As the feature amount of the inter-frame difference, the absolute value of the lightness difference between pixels at the same coordinates or the absolute value of the difference in DCT coefficient in a JPEG coded block is used. When a value obtained by integrating these absolute values in the entire image is equal to or larger than a predetermined threshold value, it is determined that a change has occurred. Whether image information after encoding or that before encoding is to used by the change detection unit 205 depends on the difference scheme. Paths of an image input to the reception unit 206 are indicated by a solid line and an alternate long and short dashed line in FIG. 2.

Although this embodiment does not depend on the change detection scheme, the inter-frame difference scheme which obtains the absolute value of the difference in DCT coefficient in each JPEG coded block is assumed for the descriptive convenience. In this case, occurrence of change detection is determined on the basis of three threshold values, i.e., sensitivity, area ratio, and duration. As for the sensitivity, when the sum of absolute values of DCT coefficient differences in each JPEG coded block is equal to or larger than the threshold value of sensitivity, it is determined a change has occurred in the block. As the sensitivity becomes high, the threshold value becomes small, and even a small change is detected. As for the area ratio, when the ratio of the total area of blocks in which changes have occurred to the area of the change detection region defined in an image is not less than a predetermined threshold value, it is determined that a changed is detected. As for the duration, when the change detected on the basis of the area ratio continues for a predetermined time more than a predetermined threshold value, it is determined that a change is finally detected. Only when this determination is done, a change detection event occurs.

As the change amount, the area ratio is selected. The time-series change in area ratio is saved in the change log accumulation unit 207 as a change log. In addition, images obtained when the area ratio is equal to or more than the threshold value and images obtained when the area ratio is smaller than the threshold value are saved in the change log accumulation unit 207. When the area ratio is equal to or more than the threshold value, images are accumulated at a predetermined time interval. The saved change detection amount and images are transmitted from the transmission unit 204 in response to a request from the setting client.

Figure 3:
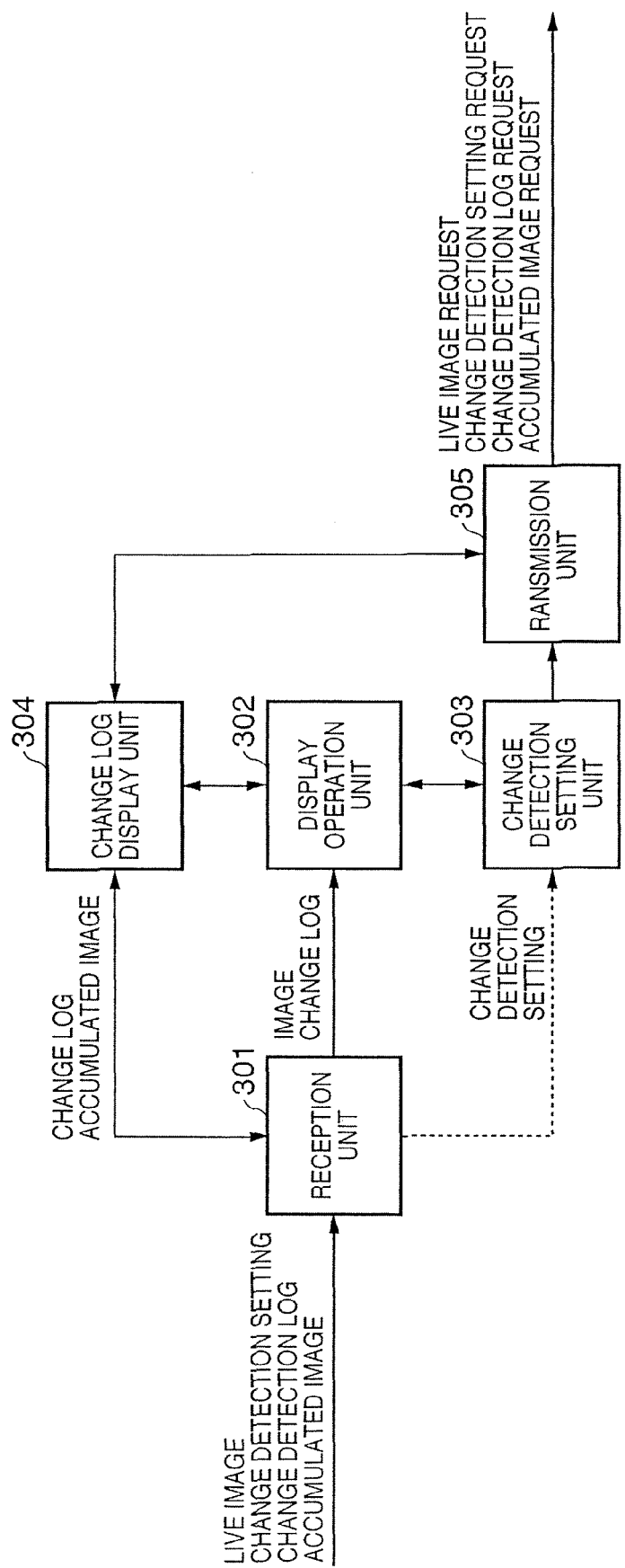
FIG. 3 is a functional block diagram of a setting client shown in FIG. 1.

Examples of the functional blocks of the setting client according to this embodiment will be described next with reference to FIG. 3. The setting client has a live image display function, motion detection setting function, motion detection log display function, and accumulated image display function. To implement these functions, the setting client includes a reception unit 301, display operation unit 302, change detection setting unit 303, change log display unit 304, and transmission unit 305. The setting client is implemented by, e.g., application software mounted on a personal computer. The setting client does not depend on specific hardware or operating system (OS) as long as the processing capability is sufficient.

An image signal is received by the reception unit 301. The signal is decoded and displayed by the display operation unit 302. A change detection result is also received by the reception unit 301 and used by the change detection setting unit 303 to initialize detection setting display. Then, the set information is displayed on the display operation unit 302. Change log information and accumulated images are received and then displayed by the change log display unit 304.

The settings to be executed by the display operation unit 302 include, e.g., designation of a change detection region on an image and designation of detection sensitivity. The designated values are transmitted to the change detection setting unit 303 and transmitted to the camera server through the transmission unit 305. An accumulated image request or a change log request is transmitted from the change log display unit 304 to the camera server through the transmission unit 305.

A protocol to acquire a change detection signal or a change detection setting signal can be mounted on the TCP protocol or HTTP protocol. However, a detailed description will be omitted because this embodiment does not depend on the information acquisition method or protocol.

The GUI (Graphical User Interface) of the setting client will be described next with reference to FIGS. 4 to 6.

Figure 4:
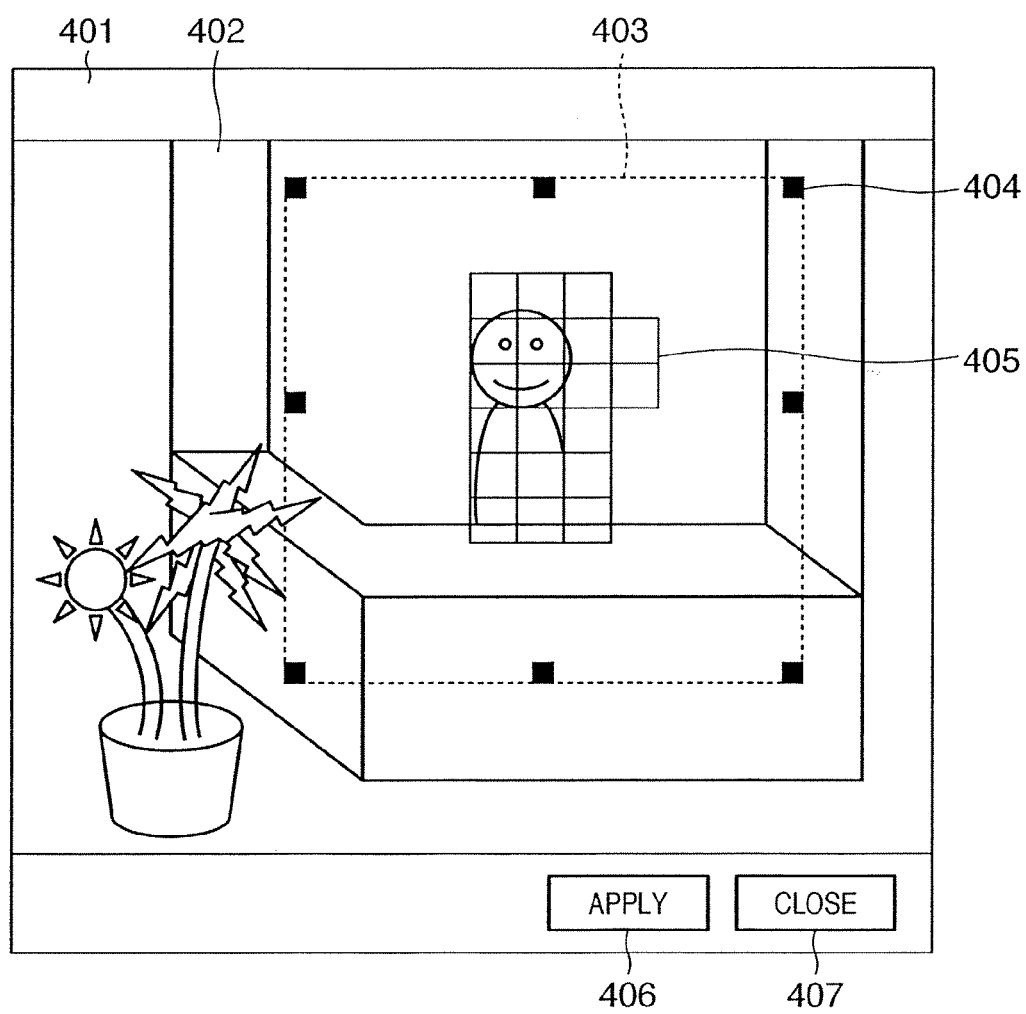
FIG. 4 is a view showing an example of a window displayed on the display operation unit of the setting client.

FIG. 4 shows an example of a window displayed on the display operation unit 302 of the setting client. It is one window displayed by the application software mounted in the window system. The window includes a window frame 401 and a client region 402. An image received from the camera server is displayed in the client region 402. A frame 403 indicating a change detection target region is displayed in the image. The size of the frame 403 can be changed by dragging latches 404 by a mouse cursor (not shown). The position of the frame can also be changed by the mouse cursor (not shown) on the frame. When an "apply" button 406 is clicked, the changed value is transmitted to the camera server.

Change detection processing is done by the camera server for the change detection target region. The position where a change has occurred is represented by the position information of a block 405 and transmitted to the client. In this embodiment, as described above, since change detection is executed for each JPEG block, block display is employed. If a change is to be detected for each pixel, the presence/absence of a change is displayed for each pixel. Reference numeral 407 denotes a button to close the window.

Figure 5:
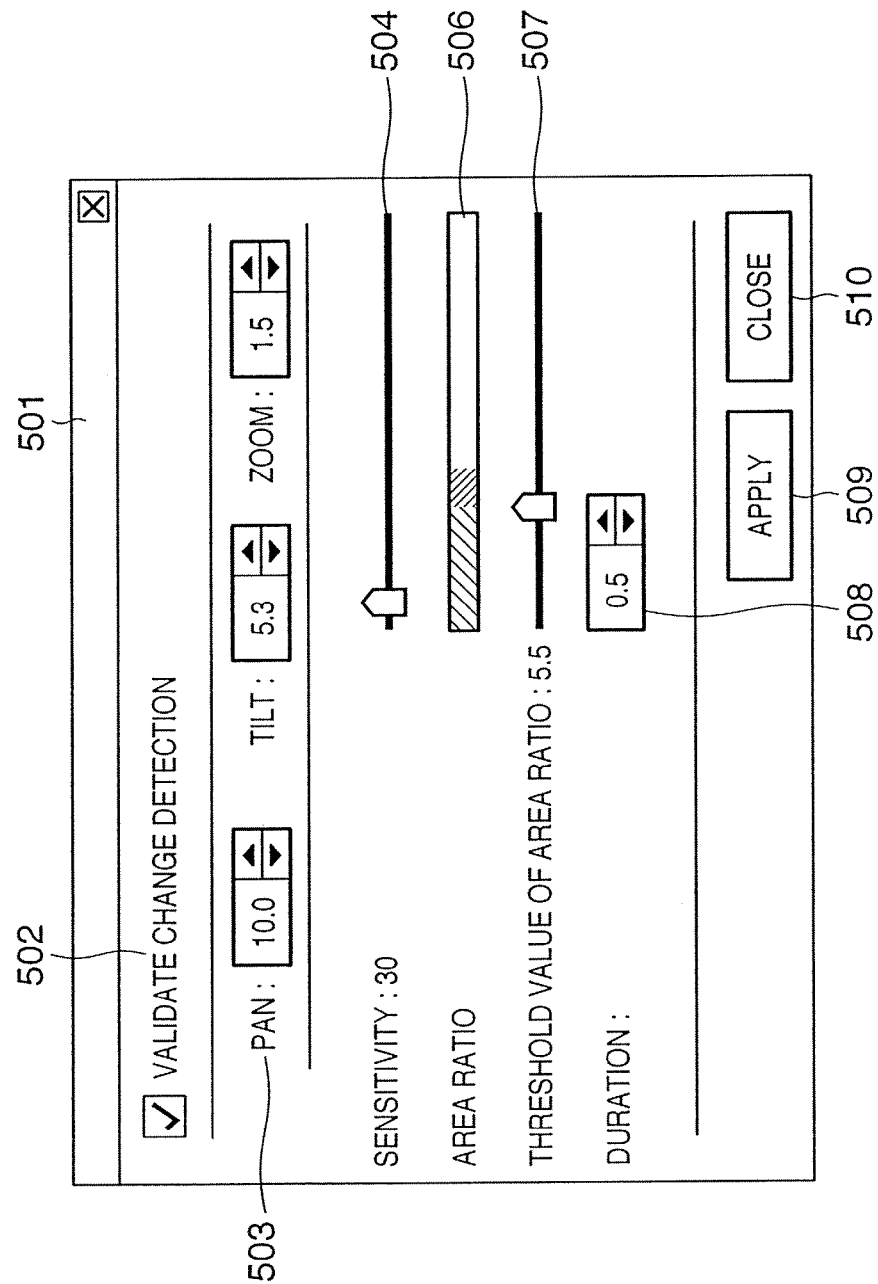
FIG. 5 is a view showing an example of a window displayed by a change detection setting unit to execute various kinds of setting.
Figure 6:
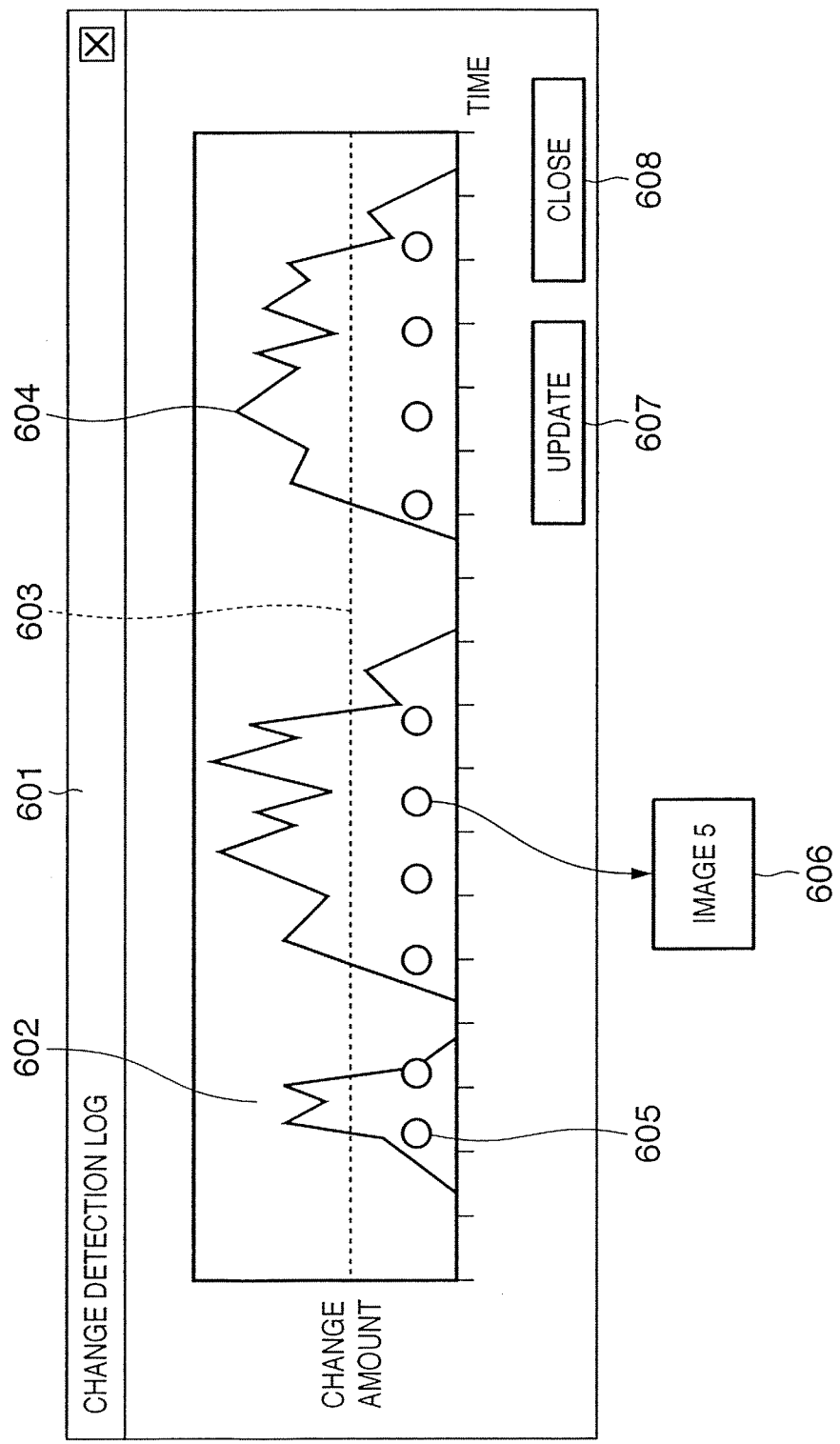
FIG. 6 is a view showing an example of a window which displays a detection log according to the first embodiment.

FIG. 5 shows an example of a window displayed by the change detection setting unit 303 to execute various kinds of setting for change detection. Reference numeral 501 denotes an outer frame of the window. A check box 502 is used to select whether the change detection function is to be validated or invalidated. An edit box 503 with up and down arrows is used to designate pan/tilt/zoom for a controllable camera. Reference numeral 504 denotes sensitivity setting. The value of the sensitivity setting, which is represented by a number, can be set by moving the slide bar. Reference numeral 507 denotes a threshold value of the area ratio. The value of the area ratio, which is represented by a number, like the sensitivity, can be set by using a slide bar.

As a current area ratio 506, the ratio of the detected region to the detection target region is indicated in real time by a graph (level bar) which changes to the left or right. With this indicator, a relation between the area ratio and the threshold value can be grasped at a glance. An edit box 508 with up and down arrows indicates/sets the threshold value of duration. A button 509 is used to apply the set values and transmit them to the camera server. A button 510 is used to close the window 501 after the end of setting.

A method of displaying and operating the motion detection log according to this embodiment will be described next with reference to FIG. 6. The window shown in FIG. 6 is also displayed on the monitor as one window 601. In this window, a log display portion 602, "update" button 607, and "close" button 608 are laid out. In the log display portion 602, a graph 604 which time-serially represents the change amount in image photographed by the camera along the ordinate is displayed. A threshold value 603 of the change amount, which is used as a criterion of change detection is indicated by a dotted line. In this embodiment, the area ratio is used as the change amount for the descriptive convenience. However, the change amount is not limited to the area ratio, and any other amount related to determination of motion detection can be used. The "update" button 607 is used to update the log display. The "close" button 608 is used to close the window 601.

The abscissa of the graph 604 may be indicated by either absolute time (standard time) or relative time. If accumulation is done for a long period, it is preferable to switch between full display and partial display or arranged a scaling button. In enlarged display or partial display, the graph is preferably scrolled in the direction of abscissa. In addition, the abscissa of the graph preferably has marks at a predetermined time interval.

When the change amount is not less than the threshold value 603, the image at that time is saved in the camera server together with the time information. In the setting client, a symbol 605 representing a change detection image is displayed on the change log graph 604 at a position corresponding to the image saving time. When the area ratio is equal to or more than the threshold value, images are accumulated at a predetermined time interval. Hence, the symbols 605 are also displayed in the graph at a predetermined interval at portions where the change amount is not less than the threshold value 603 on the graph. When the symbol 605 is designated (clicked) by the pointing device such as a mouse, a corresponding saved image 606 is loaded from the camera server and displayed. The saved image is displayed in a separate window. The image only needs to be displayed, and a description of a detailed display form will not particularly be done.

Figure 7:
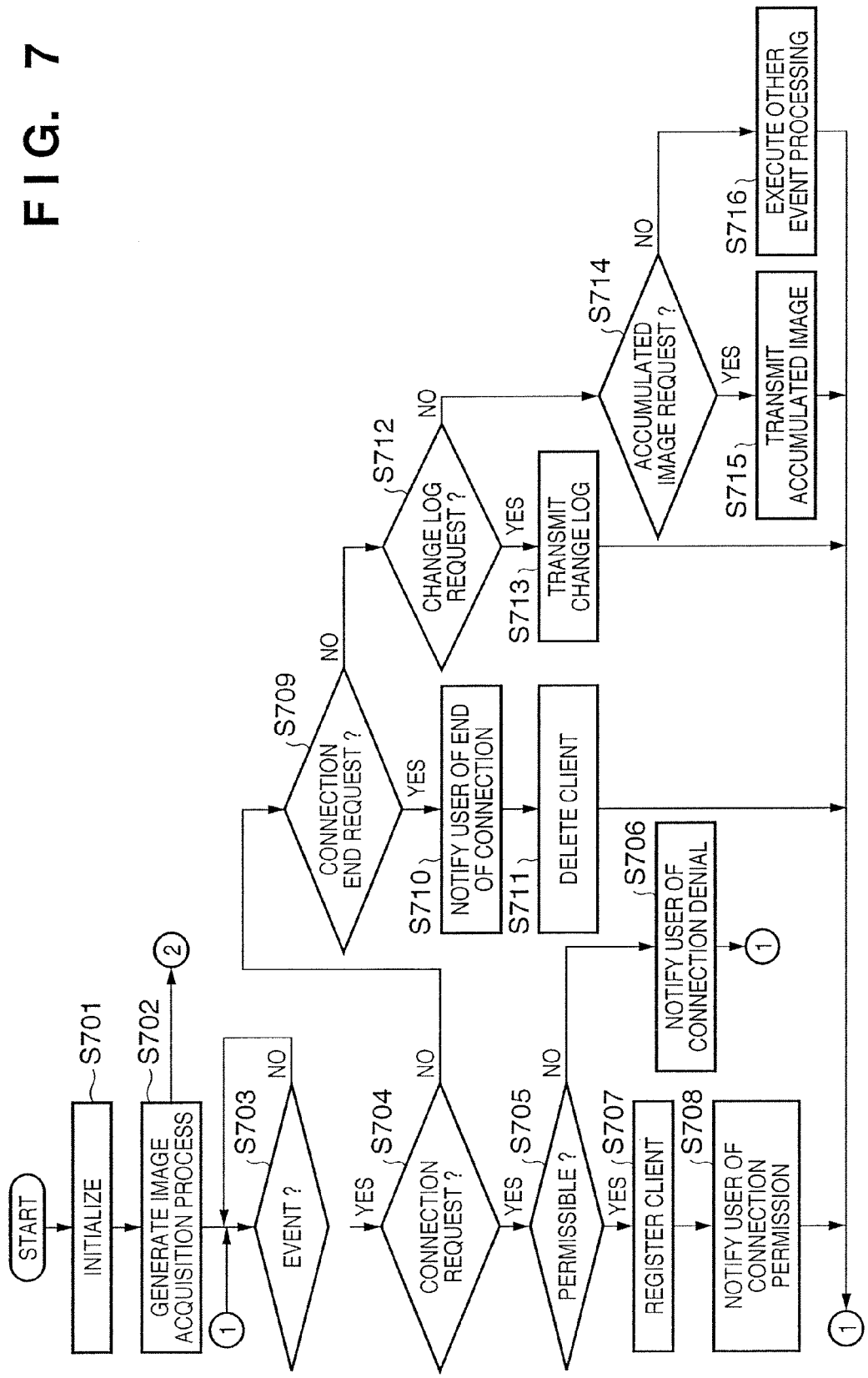
FIG. 7 is a flowchart showing the processing procedures of the main process of the camera server.
Figure 8:
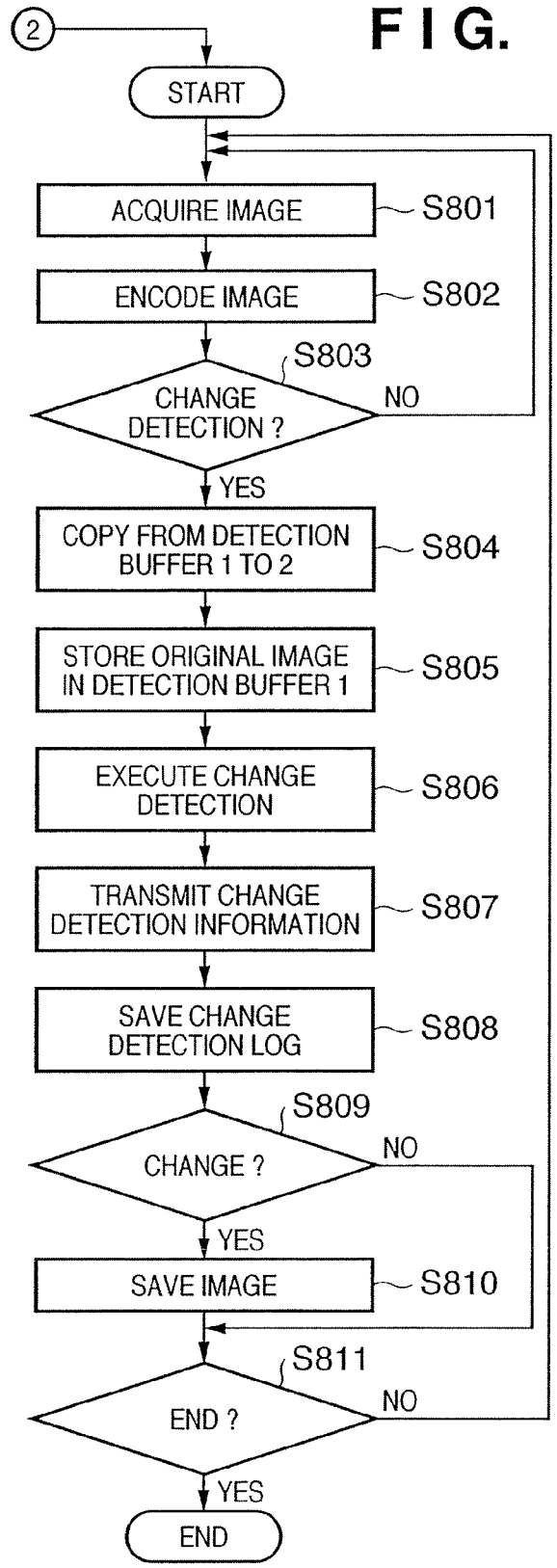
FIG. 8 is a flowchart showing the processing procedures of the sub process of the camera server.

The operation procedures of the camera server will be described next with reference to the flowcharts shown in FIGS. 7 and 8. The camera server includes a main process for the GUI and a sub process for image acquisition and change detection. FIG. 7 is a flowchart showing the operation procedures of the main process of the camera server. FIG. 8 is a flowchart showing the operation procedures of the sub process.

When the main profess shown in FIG. 7 starts, initialization is executed in step S701, and the sub process is activated in step S702. The operation procedures of the sub process will be described later with reference to FIG. 8. Then, in step S703, an event is waited. When an event occurs, processing from step S704 is executed.

In step S704, it is determined whether the event that has occurred is a connection request event. If YES in step S704, the flow advances to step S705 to determine whether connection can be permitted. This is because if the number of connections is limited, or the connection service time is limited, connection cannot be permitted. If NO in step S705, the flow advances to step S706 to execute connection denial notification. Then, the flow returns to step S703 to wait for the next event.

If YES in step S704, the flow advances to step S707 to execute client registration processing. In this processing, a management number is assigned to the client, an IP address is registered, and management data such as the connection time is initialized. In step S708, a connection permission notification is returned to the setting client. For example, the management number assigned to the client and the like are also sent together. After the end of processing, the flow returns to step S703 to wait for the next event.

If NO in step S704, the flow advances to step S709 to determine whether the event is a connection end request event. If YES in step S709, the flow advances to step S710 to notify the client of the end of connection. After that, the flow advances to step S711 to erase the management data of the client. After the end of processing, the flow returns to step S703 to wait for the next event.

If NO in step S709, the flow advances to step S712 to determine whether the event is a change log request event. If YES in step S712, the flow advances to step S713 to transmit the change log to the client which has issued the request. Then, the flow returns to step S703 to wait for the next event.

If NO in step S712, the flow advances to step S714 to determine whether the event is an accumulated image request event. If YES in step S714, the flow advances to step S715 to transmit the accumulated image to the client which has issued the request. Then, the flow returns to step S703 to wait for the next event.

If NO in step S714, the flow advances to step S716 to execute other event processing. Other event processing includes a live image request event, a change detection information request event, a change detection setting update request event, and an event of the operating system (OS). A description of this processing will be omitted because it is not directly relevant to the present invention. When other processing is ended, the flow returns to step S703 to wait for the next event.

The operation procedures of the sub process of the camera server will be described next with reference to FIG. 8. In the sub process, image acquisition and encoding, motion detection processing, change log accumulation processing, and image accumulation processing at the time of motion detection are executed at a predetermined time interval.

When the sub process starts, an image is acquired from the camera in step S801. In step S802, the image is encoded, and the encoded image is stored in an image buffer. If an image request event has occurred in the main process, the image in the image buffer is transmitted. In step S803, it is determined whether change detection processing is to be executed. Whether change detection processing is to be executed can be set by the user by using the "validate change detection" check box 502 on the setting window of the client described with reference to FIG. 5. If YES in step S803, processing from step S804 is executed. If NO in step S803, the flow returns to step S801.

In the sub process, two buffers, i.e., detection buffer 1 and detection buffer 2 are used for change detection processing. In step S804, data is copied from detection buffer 1 to detection buffer 2. In step S805, the current image is stored in detection buffer 1. In step S806, change detection is executed. Several schemes can be used for change detection, as described above. In the example to be described in this embodiment, the ratio of the detection region to the detection target region, i.e., the area ratio is obtained as the change amount.

The flow advances to step S807 to transmit information such as a change detection block, area ratio, and detection result to the setting client under connection as change detection information. The setting client receives and displays these pieces of information. In step S808, the change log information is saved.

The flow advances to step S809 to determine whether a change is detected. If YES in step S809, the flow advances to step S810 to accumulate and save the acquired image as the image at the time of detection together with time information obtained from the CPU or OS. The image accumulation/saving method is not particularly limited. A plurality of frames may continuously or intermittently be saved. If NO in step S809, the flow advances to step S811.

In step S811, it is determined whether the processing is to be ended. Normally, the flow returns to step S801 to continue the processing without ending it. If some exceptional processing takes place or an end instruction is input from the main process, the process is ended.

Figure 9:
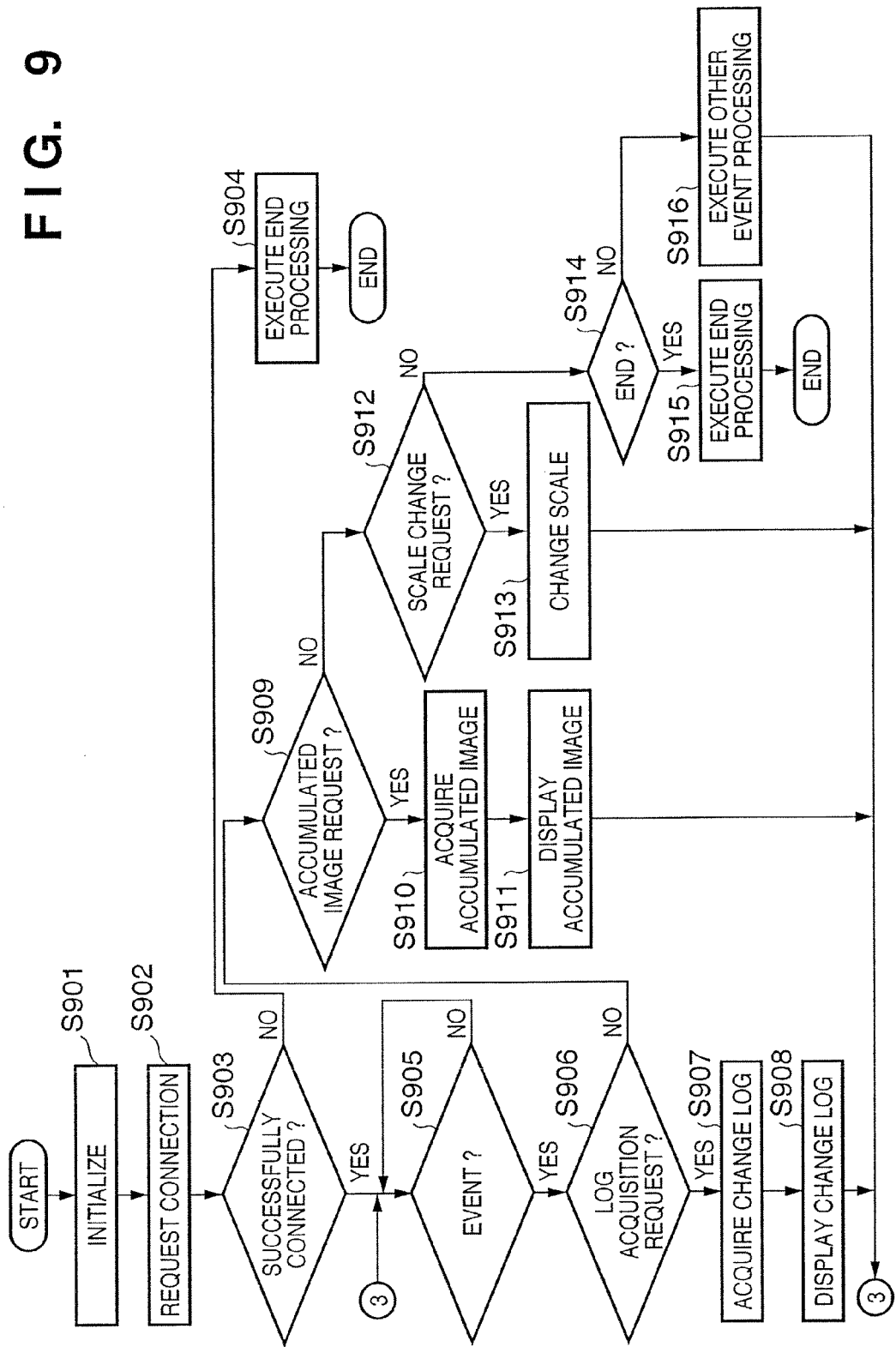
FIG. 9 is a flowchart showing the processing procedures of the setting client.

The operation procedures of the setting client will be described below with reference to the flowchart shown in FIG. 9.

First, in step S901, initialization is executed. in step S902, a connection request is sent to the camera server. In step S903, a response from the camera server is waited, and it is determined whether connection has successfully be done. If NO in step S903, the flow advances to step S904 to execute end processing so that the processing is ended. On the other hand, if YES in step S903, the flow advances to step S905 to wait for an event.

If an event has occurred in step S905, the flow advances to step S906 to determine whether the event is a log acquisition request event. The log acquisition request event occurs when the setting client is activated, or the "update" button 607 described with reference to FIG. 6 is clicked. If YES in step S906, the flow advances to step S907 to acquire the change log from the camera server. In step S908, the change log is displayed. Then, the flow returns to step S905 to wait for the next event.

If NO in step S906, the flow advances to step S909 to determine whether the event that has occurred is an accumulated image request event. The accumulated image request event occurs when the symbol 605 on the log display graph 604, which corresponds to an image, is selected (clicked) by the user by the pointing device, as described with reference to FIG. 6. If YES in step S909, the flow advances to step S910 to acquire the accumulated image from the camera server. In step S911, the acquired image is displayed. Then, the flow returns to step S905 to wait for the next event.

If NO in step S909, the flow advances to step S912 to determine whether the event that has occurred is a scale change request event. The scale change request event occurs when the window size is changed. If YES in step S912, the flow advances to step S913 to execute scale change processing. In this processing, the vertical or horizontal size of the change log display graph is changed. When the vertical size is changed, the display magnification in the vertical direction is simply changed. When the horizontal size is changed, the interval of symbols representing accumulated images also changes. If the interval is too small, and the symbols cannot be displayed, they are thinned out.

If NO in step S912, the flow advances to step S914 to determine whether the event that has occurred is an end event. If YES in step S914, the flow advances to step S915 to execute end processing. In this end processing, a disconnection request is transmitted to the camera server, and the processing is ended.

If NO in step S914, the flow advances to step S916 to execute other event processing. Other event processing includes image display processing and motion detection state display processing associated with the display window shown in FIG. 4, and change detection information reception processing and change detection setting transmission processing related to the display window shown in FIG. 4 and the setting window shown in FIG. 5. A description of this processing will be omitted because it is not directly relevant to the motion detection log display processing. When processing in step S916 is ended, the flow returns to step S905 to wait for the next event.

As is apparent from the above description, according to this embodiment, in an image change detection system including a camera server which executes acquisition of an image photographed by a camera, change detection processing of the acquired image, image accumulation, and image transmission, and a setting client which receives the image from the camera server through a network and displays the image, and executes setting of the change detection processing, the setting client can display the change log graph and images accumulated at the time of change detection in association with the graph. Hence, a time-series change in photographed image and information about an image when a change in a predetermined amount or more is detected can simultaneously be displayed such that they can easily visually be recognized.

Second Embodiment

The second embodiment of the present invention will be described below. In the second embodiment, an image change detection system similar to that of the first embodiment will be described. A description of the same parts as in the first embodiment will be omitted. Characteristic parts of the second embodiment will mainly be described.

Figure 10:
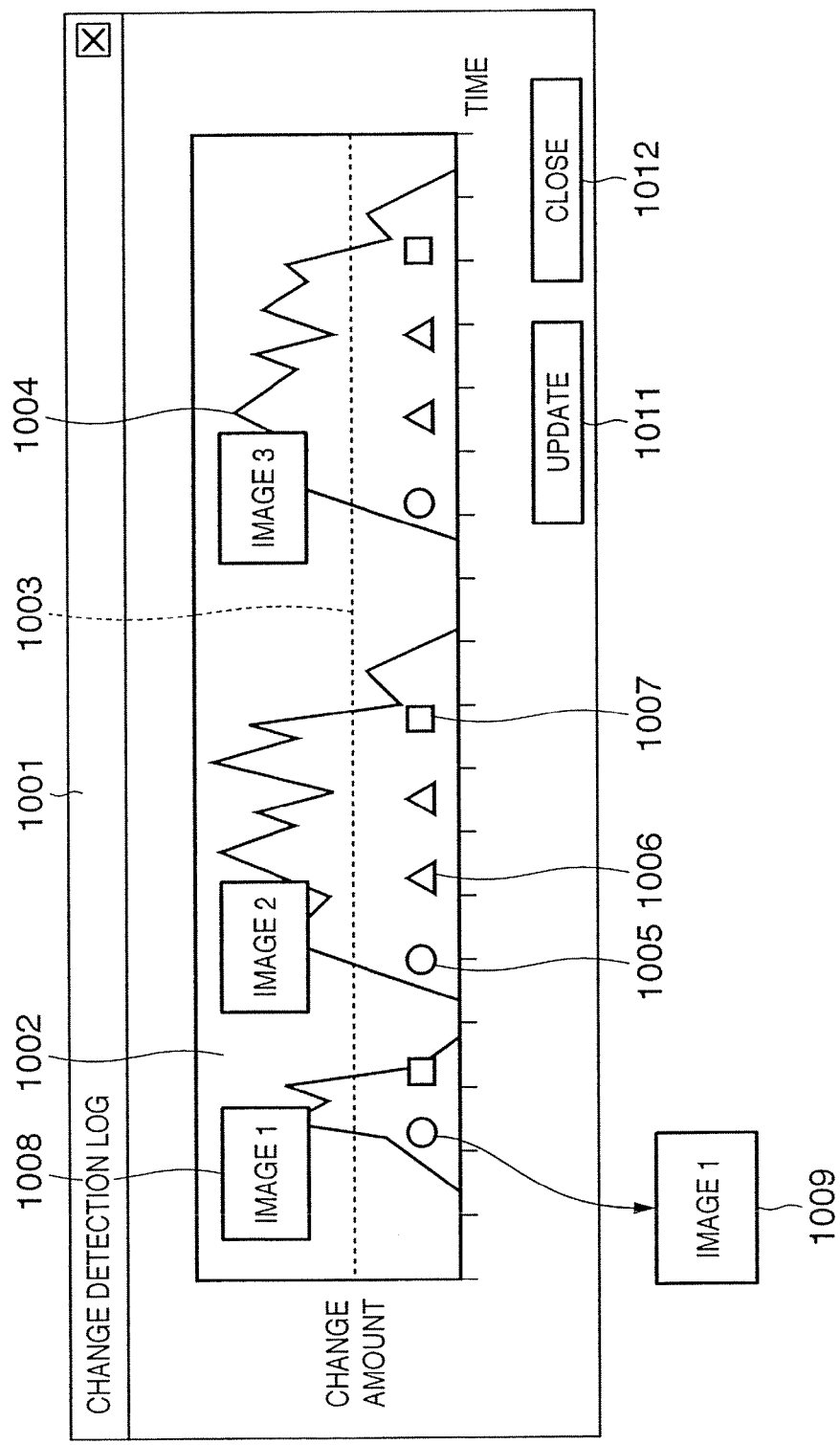
FIG. 10 is a view showing an example of a window which displays a detection log according to the second embodiment.

The second embodiment is different from the first embodiment in the motion detection log display window. FIG. 10 is a view showing the motion detection log display window according to the second embodiment.

In this embodiment, as shown in FIG. 10, in a log display portion 1002 which displays a change log in a window 1001 displayed on the monitor of a setting client, a plurality of kinds of symbols are used in accordance with the image accumulation timing as symbols representing accumulated images at the time of change detection, which are displayed in relation to a graph 1004. In the illustrated example, an image at the start of change detection is represented by a symbol 1005. An image during change detection is represented by a symbol 1006. An image at the end of change detection is represented by a symbol 1007. The symbols have different shapes. Accordingly, the start or end timing of change detection can more visually be expressed. The number of kinds of symbols to be used is not limited to three. The plurality of kinds of symbols need not have different shapes but have different colors.

When one of the symbols 1005 to 1007 is designated (clicked) by a pointing device, a corresponding accumulated image is loaded from the camera server and displayed in a separate window 1009, as in the first embodiment. A threshold value 1003, "update" button 1011, and "close" button 1012 are also the same as in the first embodiment.

In this embodiment, the accumulated image at the start of change detection is displayed in the window 1001 as a thumbnail image 1008 together with the graph. The outline of the change log can easily be understood without displaying an image with a large size. Even when the thumbnail image 1008 is selected (clicked) by the pointing device, an enlarged image is displayed in the separate window 1009, like the symbols 1005 to 1007.

The arrangement of the hardware and functional blocks (software) of this embodiment is the same as in the first embodiment, and a description thereof will be omitted. The operation procedures are partially different in the setting client. In change log acquisition in step S907 and log display in step S908 in the flowchart shown in FIG. 9, simultaneously as a log is acquired, an image at the start of change detection is acquired, and its thumbnail image is generated and displayed. When the thumbnail image is selected by the pointing device, the already acquired image is displayed in its original size.

As is apparent from the above description, according to this embodiment, different symbols are used at the start and end of change detection and during the change detection as symbols representing accumulated images. In addition, the accumulated image at the start of change is displayed as a thumbnail image. Accordingly, the outline of the change log can easily visually be understood.

Third Embodiment

The third embodiment of the present invention will be described below. In the third embodiment, an image change detection system similar to those of the first and second embodiments will be described. A description of the same parts as in the above embodiments will be omitted. Characteristic parts of the third embodiment will mainly be described.

Figure 11:
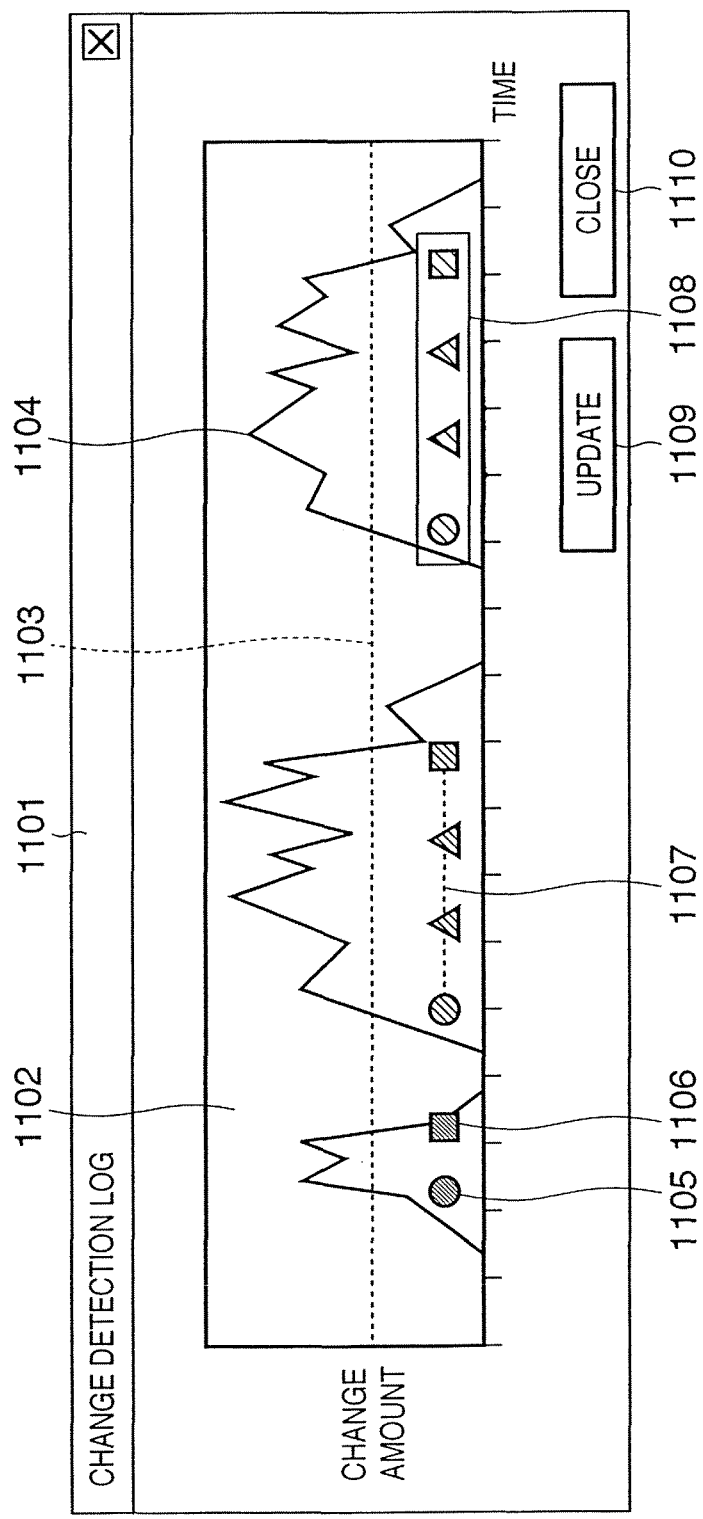
FIG. 11 is a view showing an example of a window which displays a detection log according to the third embodiment.

In the third embodiment, symbols representing accumulated images at the time of motion detection are displayed as a set in each period when the motion amount is continuously not less than the threshold value. FIG. 11 is a view showing a motion detection log display window according to the third embodiment.

As shown in FIG. 11, in this embodiment, in a log display portion 1102 which displays a change log in a window 1101 displayed on the monitor of a setting client, symbols representing accumulated images at the time of change detection, which are displayed in relation to a graph 1104, are displayed in the same color or pattern (design) in a range (also called a change range) from the start when the change amount is not less than the threshold value to the end when the change amount is less than the threshold value such that the symbols can be regarded as a group. In the illustrated example, symbols 1105 and 1106 in the first change range are expressed by the first color. Symbols 1107 in the second change range are expressed by the second color. Symbols 1108 in the third change range are expressed by the third color.

To improve readability of the change range, the symbols may be connected by a line from the start to the end of change, like the symbols 1107. Alternatively, the symbols in the change range may be put in a box, like the symbols 1108. The colors or patterns of symbols are not limited to specific colors or patterns. The line that connects the symbols or the box in which the symbols are put is not limited to a specific shape, either.

When one of the symbols 1105 and 1106 is designated (clicked) by a pointing device, a corresponding accumulated image is loaded from the camera server and displayed in a separate window, as in the first embodiment. A threshold value 1103, "update" button 1109, and "close" button 1110 are also the same as in the first embodiment.

The arrangement of the hardware and functional blocks (software) of this embodiment is the same as in the first embodiment, and a description thereof will be omitted. As for the operation procedures, the display shown in FIG. 11 is done in log display in step S908 in the flowchart of FIG. 9 which shows the operation procedures of the setting client in the first embodiment.

As described above, according to this embodiment, in the change log, symbols are displayed in different colors or patterns for each change range in which the change amount is not less than the threshold value. Hence, the change range is displayed with better readability.

Fourth Embodiment

The fourth embodiment of the present invention will be described below. In the fourth embodiment, an image change detection system similar to those of the first to third embodiments will be described. A description of the same parts as in the above embodiments will be omitted. Characteristic parts of the fourth embodiment will mainly be described.

In the fourth embodiment, change logs in a plurality of detection target regions are displayed on the monitor of a setting client. More specifically, in this embodiment, a plurality of frames 403 each indicating a change detection target region are set on the image in a client region 402 described with reference to FIG. 4. In the camera server, change detection processing is independently executed for each detection target region, and the change log and images are accumulated in accordance with the detection result.

Figure 12:
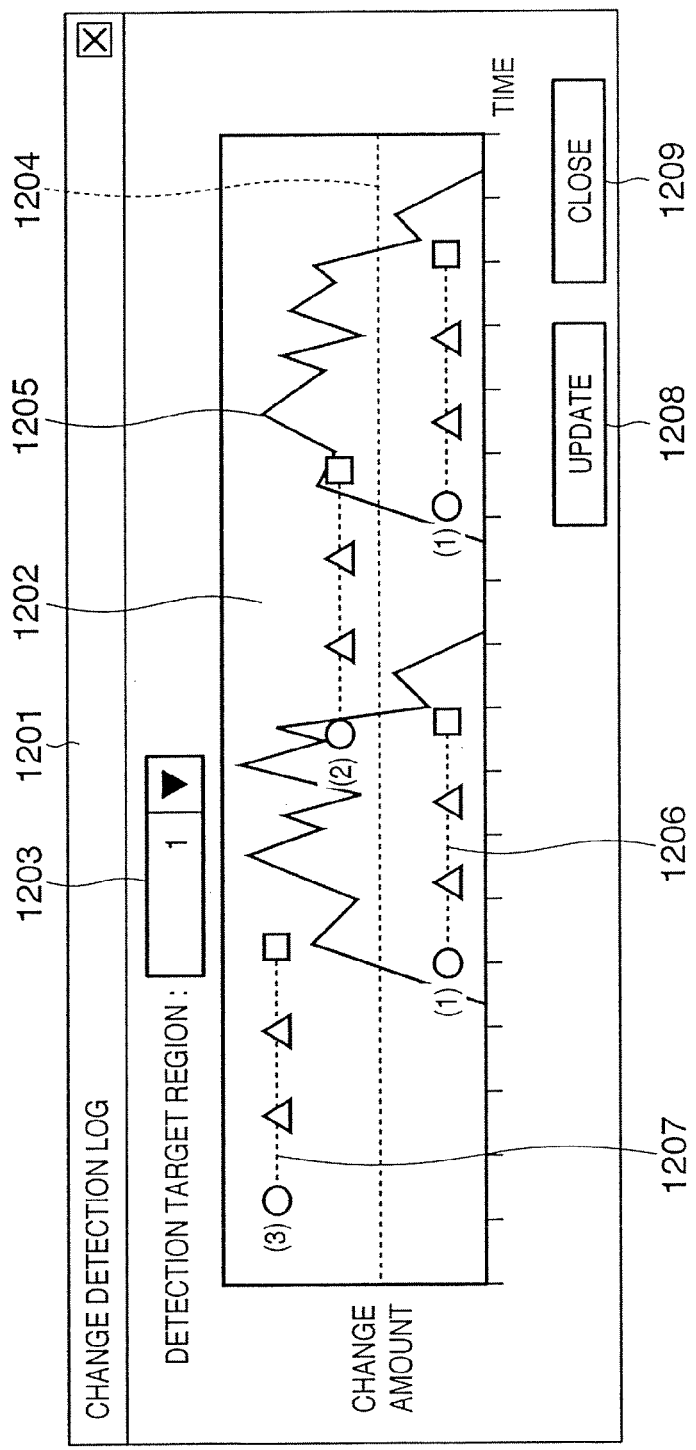
FIG. 12 is a view showing an example of a window which displays a detection log according to the fourth embodiment.

FIG. 12 is a view showing a motion detection log display window according to this embodiment. As shown in FIG. 12, in a log display portion 1202 which displays a change log in a window 1201 displayed on the monitor of a setting client, the change log of one of the plurality of detection target regions is displayed as a graph 1205. Each of the plurality of detection target regions is assigned a number. The detection target region to be displayed is set by selecting a number from a list box 1203. In the illustrated example, three detection target regions are set. The graph of a change log corresponding to the first detection target region is displayed. Symbols representing accumulated images at the time of change detection are displayed together with the numbers of the three detection target regions. Referring to FIG. 12, reference numeral 1206 denotes a symbol group of accumulated images corresponding to the first detection target region; and 1207, a symbol group of accumulated images corresponding to the third detection target region.

When one symbol in the symbol groups 1206 and 1207 is designated (clicked) by a pointing device, a corresponding accumulated image is loaded from the camera server and displayed in a separate window, as in the first embodiment. A threshold value 1204, "update" button 1208, and "close" button 1209 are also the same as in the first embodiment.

The arrangement of the hardware and functional blocks (software) of this embodiment is the same as in the first embodiment, and a description thereof will be omitted. The operation procedures are as follows. In the operation procedures of the camera server according to the first embodiment, the sub process of the camera server shown in FIG. 8 is executed for each detection target region. Then, the display shown in FIG. 12 is done in log display in step S908 in the flowchart of the setting client shown in FIG. 9.

As described above, according to this embodiment, one of the change logs of a plurality of detection target regions can selectively be displayed. In addition, symbols representing accumulated images at the time of change detection in the plurality of detection target regions can be displayed simultaneously.

Modifications to Embodiments

In the first to fourth embodiments, the present invention is applied to an image change detection system including a camera server and a setting client. The present invention can also be applied to one device (e.g., an image change diction apparatus) having a function of detecting a change in photographed image and accumulating a change log and detected images.

In the above-described embodiments, a change in image data photographed by one camera is detected, and a change log and detected images are accumulated. The present invention can also be applied to an arrangement which detects a change in each of a plurality of image data photographed by a plurality of cameras and accumulates a change log and detected images. In this case, a plurality of cameras may be connected to one camera server. Alternatively, a plurality of sets of cameras and camera servers may be prepared.

Fifth Embodiment

Figure 13:
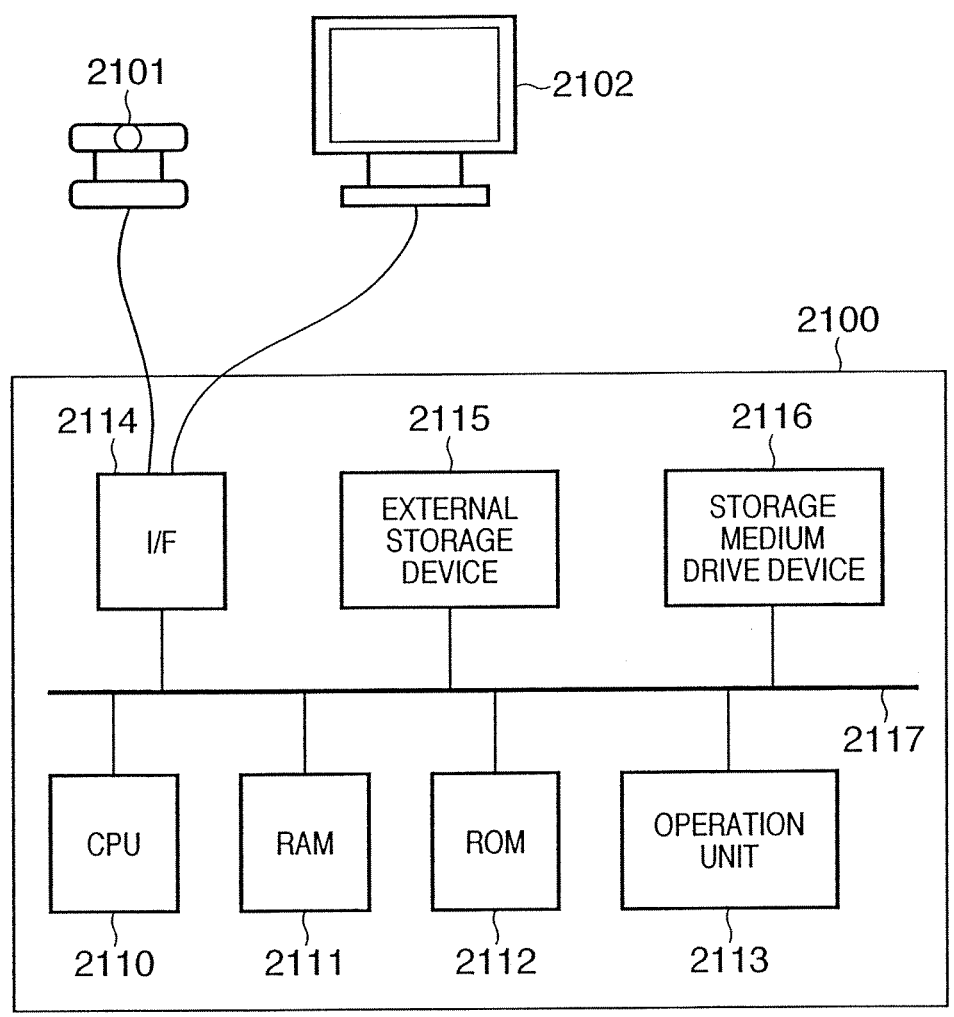
FIG. 13 is a view showing the basic arrangement of an image processing system according to the fifth embodiment of the present invention.

FIG. 13 is a view showing the basic arrangement of an image processing system according to the fifth embodiment. The image processing apparatus according to this embodiment is roughly divided into a video camera 2101, display device 2102, and computer 2100. The video camera 2101 senses a moving image in a real space. Each frame image is output to the computer 2100 as data.

The display device 2102 includes a CRT or liquid crystal screen to display a GUI (to be described later) and the like.

The video camera 2101 and display device 2102 are connected to an interface unit 2114 of the computer 2100. The basic arrangement of the computer 2100 will be described below.

A CPU 2110 controls the entire computer 2100 by using programs and data stored in a RAM 2111 and ROM 2112 and also executes processing to be described later.

The RAM 2111 has an area to temporarily store programs and data loaded from an external storage device 2115 or storage medium drive device 2116, an area to temporarily store each frame image data output from the video camera 2101, and a work area to be used by the CPU 2110 to execute various kinds of processing.

The ROM 2112 stores a boot program and setting data of the apparatus. An operation unit 2113 includes a keyboard and mouse so that various kinds of instructions can be input to the CPU 2110. The interface (I/F) 2114 connects the video camera 2101 and display device 2102 to the computer 2100. The frame image data output from the video camera 2101 is output to the RAM 2111 through the I/F 2114. An image or character signal corresponding to image or character data generated on the RAM 2111 by the computer 2100 is output to the display device 2102 through the I/F 2114.

The external storage device 2115 saves programs and data which causes the OS or CPU 2110 to execute each processing to be described later. The programs and data are loaded to the RAM 2111 as needed under control of the CPU 2110. Data of moving images sensed in the past by the video camera 2101 may also be saved and used in processing to be described later.

The storage medium drive device 2116 reads out a program or data stored in a storage medium such as a CD-ROM or DVD-ROM and outputs it to the RAM 2111 or external storage device 2115. "Programs and data which cause the CPU 2110 to execute each processing to be described later" may be stored in a storage medium and loaded to the RAM 2111 by the storage medium drive device 2116.

A bus 2117 connects the above-described components.

The operation of the system having the above arrangement will be described next. In the system according to this embodiment, each frame image sensed by the video camera 2101 is received, and when the difference between frame images is equal to or more than a predetermined value, the user is notified of it. In this embodiment, when the number of pixels whose colors have changed between the fth frame image and the (f+1)th frame image is a predetermined number or more, the user is notified of it (motion present). In this case, the "predetermined number" must be set in advance. Processing for setting the "predetermined number" (to be referred to as a set value hereinafter) will be described below.

Each frame image sensed by the video camera 2101 is input to the RAM 2111 through the I/F 2114 and accumulated. Each frame image has a time code information representing the sensing time, as shown in FIG. 18.

Figure 18:
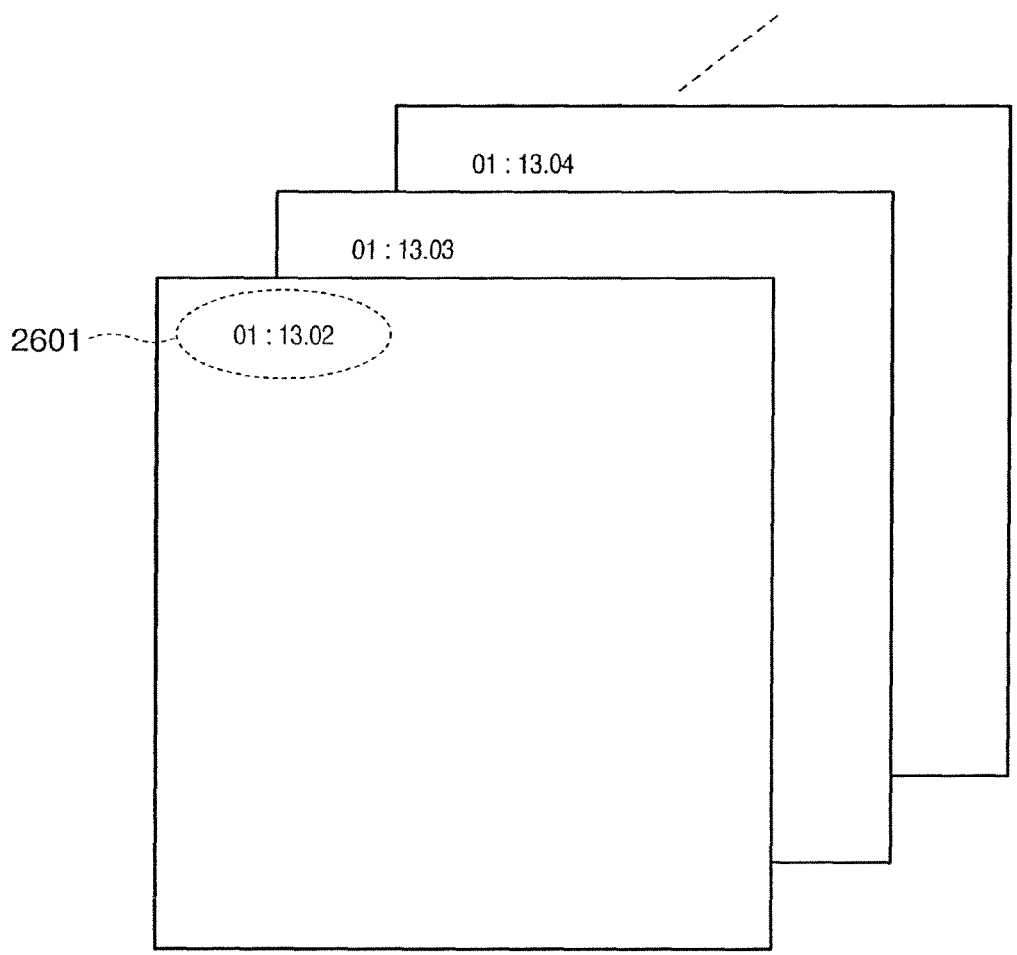
FIG. 18 is a view for explaining time code information.

FIG. 18 is a view for explaining time code information. Referring to FIG. 18, reference numeral 2601 denotes time code information attached to an image. The attachment form is not limited to this.

When a plurality of number of frame images are accumulated in the RAM 2111, the CPU 2110 of the computer 2100 generates an average image. For example, when 30 frame images are accumulated in the RAM 2111, the pixel values at the same position in the frame images are added, and the sum is divided by 30. An image having the product as a pixel value is generated as the average image. The image is generally generated by $$A(i,j) = (F(i,j,1) + F(i,j,2) + \ldots + F(1,j,M))/M$$

where $A(i,j)$ is the pixel value at a position $(i,j)$ in an average image A ($1 \leq i \leq V$, $1 \leq j \leq H$; V is the horizontal size of the average image A, and H is the vertical size of the average image A), and $F(i,j,x)$ is the pixel value at the position $(i,j)$ in the xth ($1 \leq x \leq M$) frame image. This equation generates the average image of M frame images. The data of a thus generated average image is stored in the RAM 2111.

The CPU 2110 generates an average image every time a predetermined number of frame images are accumulated in the RAM 2111. More specifically, the frames are divided into groups each including the predetermined number of frames, and an image is generated by averaging the frame images in each group. This processing is executed for each group.

Figure 14:
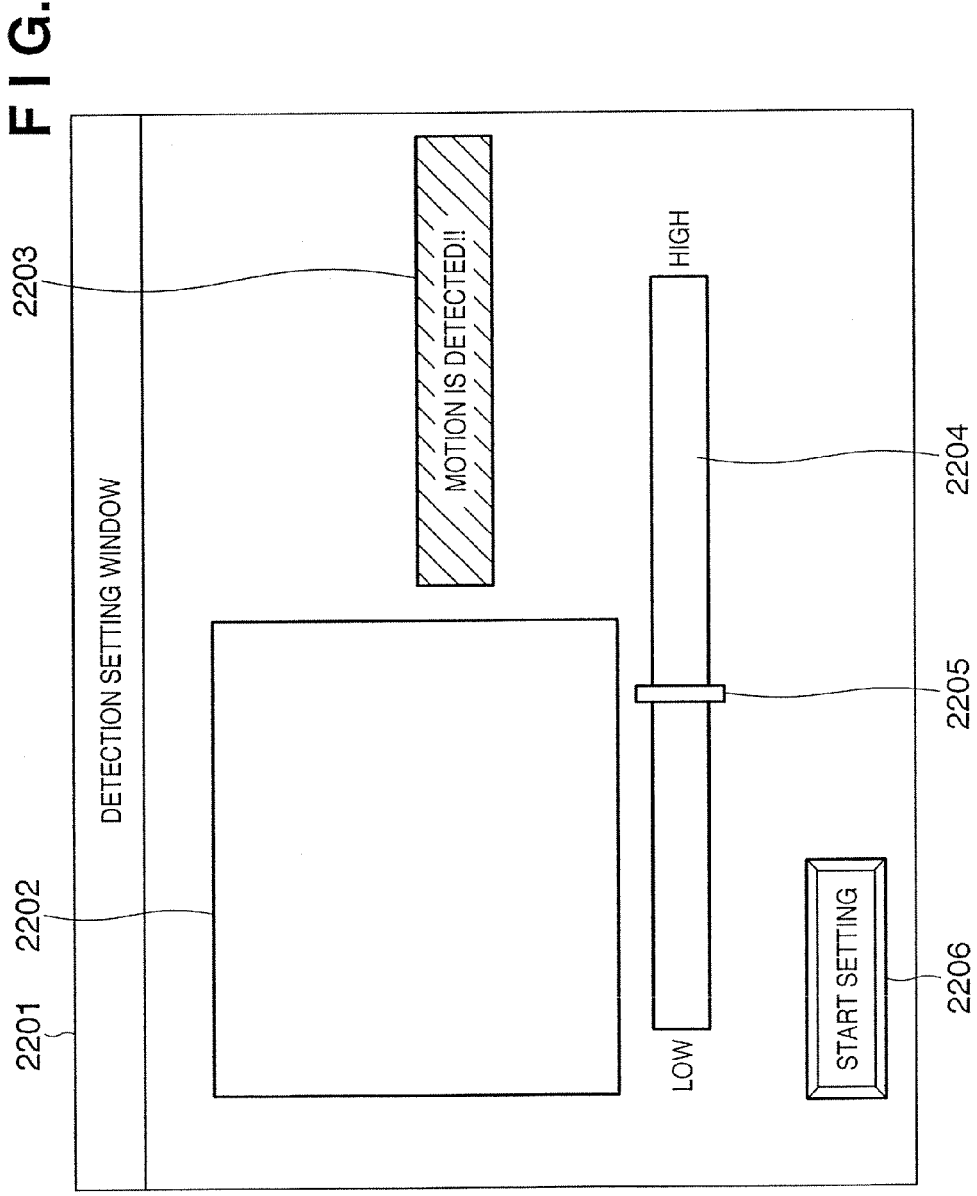
FIG. 14 is a view showing a display example of a GUI to notify a user that a change equal to or more than a set value (to be described later) is detected between frame images input from a video camera 2101.

A GUI as shown in FIG. 14 is displayed on the display screen of the display device 2102. FIG. 14 is a view showing a display example of a GUI to notify a user that a change equal to or more than a set value (to be described later) is detected between frame Images input from the video camera 2101.

Referring to FIG. 14, a window 2201 of the GUI has portions to be described later. In a region 2202, frame images input from the video camera 2101 are sequentially displayed. The CPU 2110 resizes each frame image sequentially input from the video camera 2101 to the RAM 2111 and displays the frame image in the region 2202.

A message 2203 is displayed when the number of pixels whose colors have changed between frames is a predetermined number or more. The contents of the message are not limited to this. If the number of pixels whose colors have changed less than a predetermined number, a message representing it may be displayed, or display may be omitted.

GUIs 2204 and 2205 are used to display the set value. The region 2204 indicates the possible range of the set value. The slider 2205 indicates the position of the set value determined by processing to be described later in the region 2204. For example, when the position of the slider 2205 in the region 2204 is close to "low" (left end in FIG. 14), the slider 2205 indicates that the set value is large. When the position of the slider 2205 in the region 2204 is close to "high" (right end in FIG. 14), the slider 2205 indicates that the set value is small.

As described above, the set value indicates the number which the number of pixels whose colors have changed between frames should exceed to display the message "motion present". When the set value is large, the notification "motion present" is not displayed unless the number of pixels whose colors have changed between frames is large. That is, the sensitivity for detecting a change between frame images is low. On the other hand, when the set value is small, the notification "motion present" is displayed even when the number of pixels whose colors have changed between frames is small. That is, the sensitivity for detecting a change between frame images is high.

As described above, the set value determines the sensitivity for detecting a change between frame images and is used to determine whether the notification "motion present" is displayed. This setting is important. In this embodiment, the set value is determined by processing to be described later.

Figure 17:
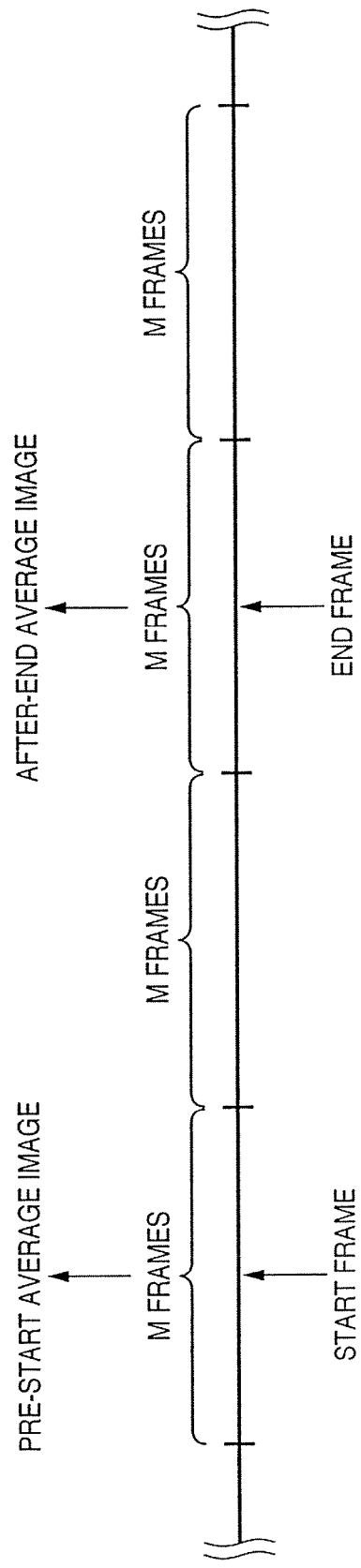
FIG. 17 is a view for explaining average image generation processing.

A button image 2206 is used to designate the start and end points of a sample frame (to be described later) in the CPU 2110. When designation is done by using the keyboard or mouse included in the operation unit 2113 (when the button image 2206 is clicked), the CPU 2110 stores, in the RAM 2111, data representing the time (start time) of detection of the instruction. As described above, when a predetermined number of frame images are accumulated in the RAM 2111, the CPU 2110 generates an average image. Hence, the CPU 2110 should also have generated the average image of a predetermined number of frame images including a frame (start frame) having time code information representing the start time. As shown in FIG. 17, an average image of M frames (corresponding to the predetermined number of frames) including the start frame will be referred to as a pre-start average image hereinafter.

When designation of the button image 2206 is stopped (when the button image 2206 is clicked again to release the pressed state), the CPU 2110 stores, in the RAM 2111, data representing the time (end time) of detection of release of the pressed state of the button image 2206. As described above, when a predetermined number of frame images are accumulated in the RAM 2111, the CPU 2110 generates an average image. Hence, the CPU 2110 should also have generated the average image of a predetermined number of frame images including a frame (end frame) having time code information representing the end time. As shown in FIG. 17, the average image of M frames (corresponding to the predetermined number of frames) including the end frame will be referred to as an after-end average image hereinafter.

Figure 15:
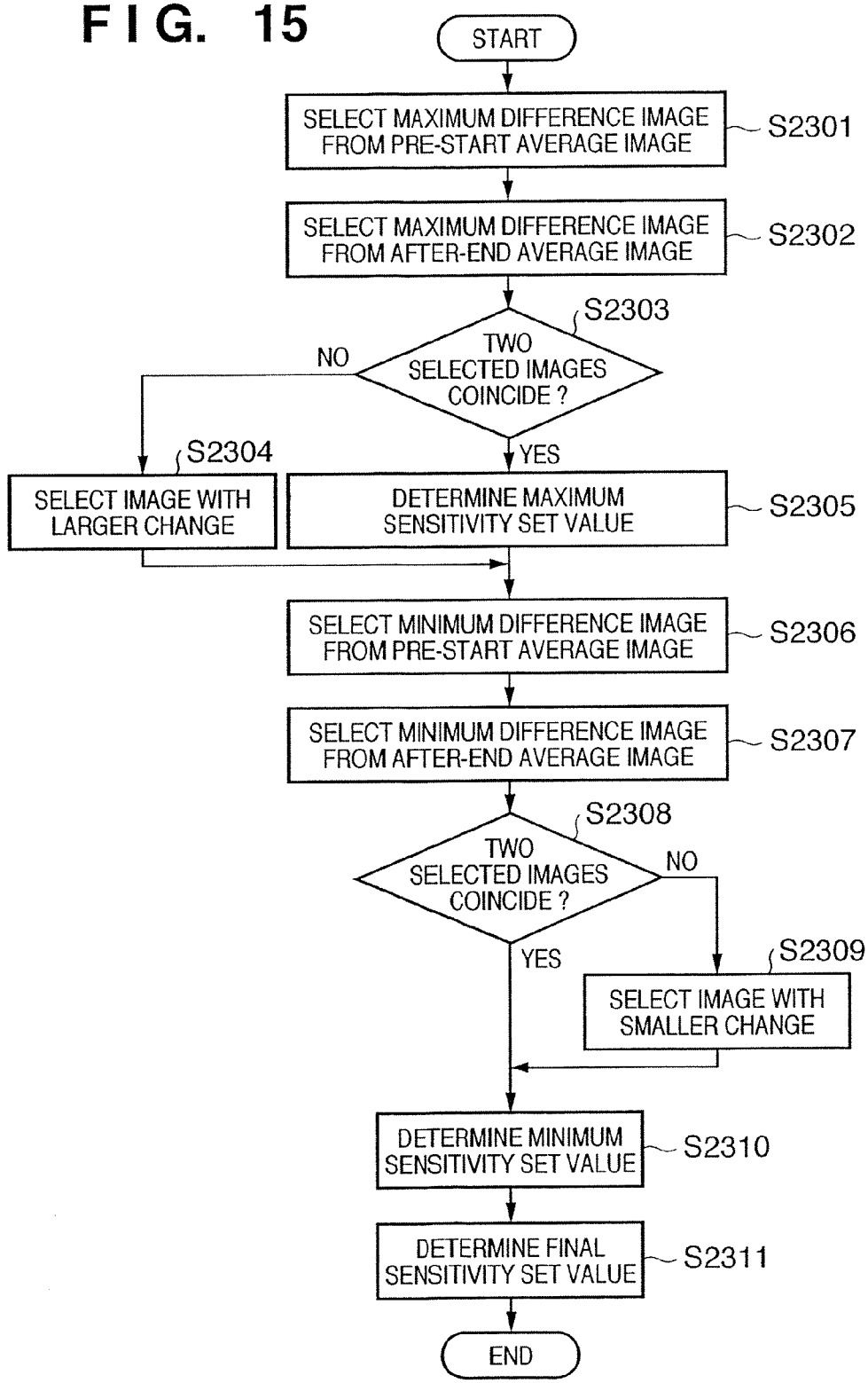
FIG. 15 is a flowchart of processing for obtaining a set value.

Upon detecting that the pressed state of the button image 2206 is released, the computer 2100 starts processing for obtaining the set value in accordance with the flowchart shown in FIG. 15.

FIG. 15 is a flowchart of processing for obtaining the set value. A program corresponding to the flowchart shown in FIG. 15 is loaded from the external storage device 2115 or from a storage medium to the RAM 2111 by the storage medium drive device 2116. When the CPU 2110 executes the program, the computer 2100 executes processing to be described later.

First, frame images each having time code information representing the time from the start time to the end time are compared with the pre-start average image. A frame image (maximum difference image) containing pixels with different pixel values in maximum is specified. The time code information attached to the maximum difference image is stored in the RAM 2111. In addition, the number of pixels whose pixel values have changed between the maximum difference image and the pre-start average image is stored in the RAM 2111 (step S2301).

For example, let st be the start time, et be the end time, ft be frame images (i.e., frame images from the start frame to the end frame) each having time code information representing a time t (st≤t≤et), and sI be the pre-start average image. The pixel values of corresponding pixels are compared between the image ft and image sI. If the pixel values are different, a count value C is incremented by one. When this processing is executed for all corresponding pixels, the number (count value C) of pixels having different pixel values between the image ft and the image sI can be counted. When this processing is executed for all values t that satisfy st≤t≤et, the count value C can be obtained for each frame image from the start frame to the end frame. The frame image with the maximum count value C is the image having the maximum difference from the pre-start average image in the frame images from the start frame to the end frame.

The time code information attached to the maximum difference image specified in the above way is stored in the RAM 2111. Simultaneously, the number (maximum count value C) of pixels having different pixel values between the maximum difference image and the pre-start average image is stored in the RAM 2111.

Next, the frame images each having time code information representing the time from the start time to the end time are compared with the after-end average image. A frame image (maximum difference image) containing pixels with different pixel values in maximum is specified. The time code information attached to the maximum difference image is stored in the RAM 2111. In addition, the number of pixels whose pixel values have changed between the maximum difference image and the after-end average image is stored in the RAM 2111 (step S2302). The processing in step S2302 is done by executing the same processing as in step S2301 while "pre-start average image" in the description is changed to "after-end average image".

It is determined whether the frame specified in step S2301 equals the frame specified in step S2302 (step S2303). This comparison is done by comparing the time code information specified in the respective steps and determining whether the pieces of time code information indicate the same time.

If NO in step S2303, the flow advances from step S2303 to S2304 to select, of the count values stored in the RAM 2111 in step S2301 or the count values stored in the RAM 2111 in step S2302, a larger count value is selected (step S2304). The selected count value C is set as a maximum sensitivity set value (step S2305).

If YES in step S2303, the flow advances from step S2303 to S2305 to set the data of the count value C stored in the RAM 2111 in step S2301 or S2302 as a maximum sensitivity set value (step S2305).

Next, frame images each having time code information representing the time from the start time to the end time are compared with the pre-start average image. A frame image (minimum difference image) containing pixels with different pixel values in minimum is specified. The time code information attached to the minimum difference image is stored in the RAM 2111. In addition, the number of pixels whose pixel values have changed between the minimum difference image and the pre-start average image is stored in the RAM 2111 (step S2306). The processing in step S2306 is done by executing the same processing as in step S2301 while "maximum" in the description is changed to "minimum".

The frame images each having time code information representing the time from the start time to the end time are compared with the after-end average image. A frame image (minimum difference image) containing pixels with different pixel values in minimum is specified. The time code information attached to the minimum difference image is stored in the RAM 2111. In addition, the number of pixels whose pixel values have changed between the minimum difference image and the after-end average image is stored in the RAM 2111 (step S2307). The processing in step S2307 is done by executing the same processing as in step S2306 while "pre-start average image" in the description is changed to "after-end average image".

When the difference between two images compared in step S2306 or S2307 is too small (for example, when the image size is 320×400, and the difference is 100 pixels), the result of comparison processing is invalidated, and the next comparison processing is started.

It is determined whether the frame specified in step S2306 equals the frame specified in step S2307 (step S2308). This comparison is done by comparing the pieces of time code information specified in the respective steps and determining whether the pieces of time code information indicate the same time.

If NO in step S2308, the flow advances from step S2308 to S2309 to select, of the count values stored in the RAM 2111 in step S2306 or the count values stored in the RAM 2111 in step S2307, a smaller count value is selected (step S2309). The selected count value C is set as a minimum sensitivity set value (step S2310).

If YES in step S2308, the flow advances from step S2308 to S2310 to set the data of the count value C stored in the RAM 2111 in step S2306 or S2307 as a minimum sensitivity set value (step S2310).

The final sensitivity set value as the set value" is obtained by using the maximum and minimum sensitivity set values obtained by the above processing (step S2311). Various methods are available to obtain the final sensitivity set value. For example, the average value of the maximum and minimum sensitivity set values is calculated, and the resultant average value is set as the final sensitivity set value. The maximum sensitivity set value may directly be set as the set value. The minimum sensitivity set value may directly be set as the set value.

The CPU 2110 moves the slider 2205 in the region 2204 to a position corresponding to the final sensitivity set value obtained by the above processing.

With the set value obtained by the above processing, when a change more than an average change (the average number of pixels whose pixel values change) has occurred between frames, the user is notified of it.

For example, a person passes by the video camera 2101, and its video image is input to the computer 2100 through the video camera 2101 as a moving image. The set value obtained by the above processing can be applied to determine whether a change has occurred in a moving image sensed by a surveillance camera in a building at night. The change in real space to be detected is played back in front of the video camera 2101, the set value is automatically changed.

As described above, according to this embodiment, the set value can be obtained without manual operation.

In addition, when each of the maximum and minimum sensitivity set values is used as a criterion, setting to detect a change equal to or more than a predetermined value and setting not to detect a change less than the predetermined value can simultaneously be executed.

In this embodiment, the notification "motion present" is "displayed" on the GUI shown in FIG. 2. However, the present invention is not limited to this. A speaker may be connected to the computer 2100, and voice data of the notification message "motion present" may be loaded in the RAM 2111 so that voice is output from the speaker in accordance with the voice data for notification. The notification form is not particularly limited.

In this embodiment, time code information is used to identify each frame. Each frame may be identified by another method.

In this embodiment, processing is executed for entire frame image. In some cases, even a change in part of an image should be detected. In this case, the above-described processing is executed for only a known region in an image. Accordingly, a set value to do notification when a change has occurred in that region can be obtained.

Sixth Embodiment

To obtain the maximum and minimum sensitivity set values, the average image of the pre-start average image and after-end average image is obtained. The maximum and minimum values of the difference (the number of pixels with different pixel values) between the average image and each frame from the start frame to the end frame are obtained as the maximum and minimum sensitivity set values.

Seventh Embodiment

In the fifth embodiment, a moving image input from the video camera 2101 is processed. However, the present invention is not limited to this. Moving image data loaded from an external storage device 2115 or storage medium drive device 2116 to a RAM 2111 may be processed.

Figure 16:
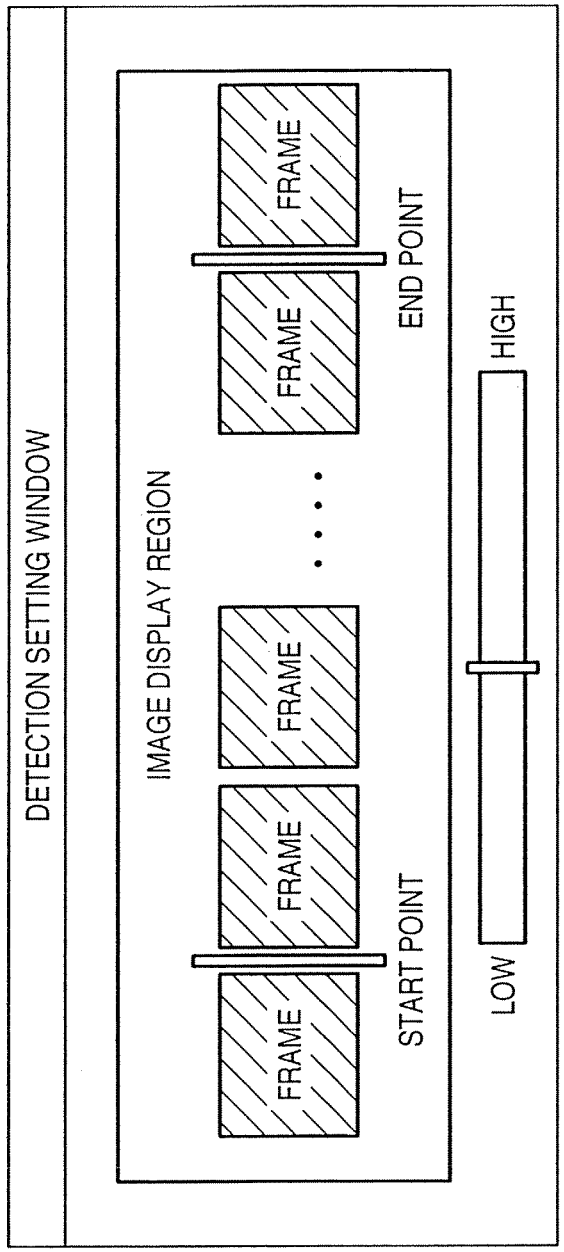
FIG. 16 is a view showing a display example of a GUI which displays a list of frame images and executes an operation of setting a set value.

In this case, instead of sequentially displaying each frame image in a region 2202, some or all frames may be displayed as a list, as shown in FIG. 16. FIG. 16 is a view showing a display example of a GUI which displays a list of frame images and executes the operation of setting a set value.

In this case, the start and end frames can be designated by designating them using the keyboard or mouse as an operation unit 2113. Of the two designated positions, the left position is the position of the start frame, and the right position is the position of the end frame.

In this case, frames to be used to obtain the pre-start average image and after-end average image can also be designated by designating them on the GUI shown in FIG. 16.

In the fifth embodiment, the sensitivity (set value) is determined by a single parameter. However, even in a motion detection scheme which designates the sensitivity by a plurality of parameters, the same processing as in the fifth embodiment can be executed for one parameter.

For example, an image is segmented into small rectangles. A change in pixel value is detected in each rectangle, and simultaneously, a change between the rectangles is detected. In this case, the sensitivity is set as two parameters "intra-rectangle sensitivity" and "inter-rectangle sensitivity". In this case, one of the "intra-rectangle sensitivity" and "inter-rectangle sensitivity" is fixed or designated by the user. The other parameter is automatically set by the same method as in the fifth embodiment.

Alternatively, when the "intra-rectangle sensitivity" and "inter-rectangle sensitivity" are internally mapped to one parameter, automatic setting can be executed. In this case, for example, "virtual sensitivity" is introduced, which is given by virtual sensitivity=f(intra-rectangle sensitivity, inter-rectangle sensitivity) ("Virtual sensitivity" is "virtual" because it is not presented to the user, and "f" is an appropriate function. The pairs of virtual sensitivity and intra-rectangle sensitivity and inter-rectangle sensitivity have a one-to-one correspondence. For example, when the intra-rectangle sensitivity takes a value from 0 to 100, virtual sensitivity="inter-rectangle sensitivity"×100+"intra-rectangle sensitivity" can be used).

Accordingly, the number of parameters is substantially one. Hence, sensitivity setting can be implemented by the same method as in the fifth embodiment.

In the fifth embodiment, "processing for obtaining the set value" and "processing of executing notification "motion present" in accordance with the obtained set value" are done by one computer. Instead, the processing operations may be distributed to a plurality of computers.

Eighth Embodiment

In the eighth embodiment of the present invention, an example of motion detection setting will be described, in which in sensitivity setting for motion detection processing by the difference between images, a time in which a motion is present and a time in which no motion is present are designated for a live image, thereby automatically calculating and displaying an appropriate sensitivity range.

Hardware in this embodiment includes a camera and a connectable computer. Examples of the video output scheme of the camera are NTSC (National Television System Committee), PAL (Phase Alternation by Line color television), and an independent scheme by USB (Universal Serial Bus) or IEEE1394 connection. The present invention does not depend on the video output scheme. The computer has a CPU, RAM, ROM, secondary storage device, monitor, keyboard, mouse, and external input/output interface. The computer only needs to have a function of inputting video data from the camera. The form of the computer is not particularly limited, and any commercially available computer, dedicated set-top box, portable information terminal, or cellular phone terminal can be used.

In the following description, the camera and computer are directly connected, and setting is done on the computer. Instead, setting may be done from another computer via a network. Alternatively, the camera may have a network connection function so that the computer can acquire video data from the camera through a network and execute motion detection processing.

Software in this embodiment includes an image processing process for acquiring an image from the camera and executing motion detection processing on the computer and a GUI process for displaying the image and motion detection processing result and executing setting. The GUI process is the main process, and the image processing process is the sub process. A process is a program execution unit. A process may include either a plurality of programs or an execution unit called a thread in a single program.

The outline of motion detection processing by a difference will be described next with reference to FIG. 19. An image sensing unit 3011 is a camera which inputs video data. An image acquired from the camera is used for reference image generation by a reference image generation unit 3012. The reference image changes depending on the difference algorithm. Typical examples of difference processing are inter-frame difference or background difference. In inter-frame difference, the reference image is an image one or a plurality of frames before. In background difference, for example, the average image or median image of a plurality of frames during a past time period without any motion is used.

A difference processing unit 3013 executes difference processing for the input image and reference image to calculate a change amount. In typical difference processing, the sum of the absolute differences between the input image and the reference image is calculated as the change amount. For example, the RGB components or YCbCr components of pixels or the code amounts or DCT coefficients of JPEG coded blocks are used for the difference operation.

A discrimination processing unit 3014 discriminates whether the obtained difference amount corresponds to a state "motion present". In most cases, when the difference amount is not less than a predetermined threshold value, the state is regarded as "motion present". If the difference amount is equal to or less than the threshold value, the state is regarded as "no motion". The threshold value can be set or changed by the user by a setting unit 3015. The threshold value is often converted into "sensitivity" by the setting unit 3015, and displayed or designated. When the threshold value is large, the sensitivity is low. When the threshold value is small, the sensitivity is high. For example, the relationship between sensitivity S and a threshold value Th is given by $$S=a(Th\max-Th)+b$$

where Thmax is the maximum value of the threshold value, and a and b are constants.

An example of the motion detection scheme by typical difference has been described above. The method of this embodiment executes difference processing on the basis of a change amount and a threshold value and does not depend on the type of difference operation of obtaining a change amount.

An algorithm for obtaining an appropriate threshold value range by designating a change amount and the presence/absence of motion in moving images will be described next with reference to FIGS. 20A and 20B.

Figure 20A:
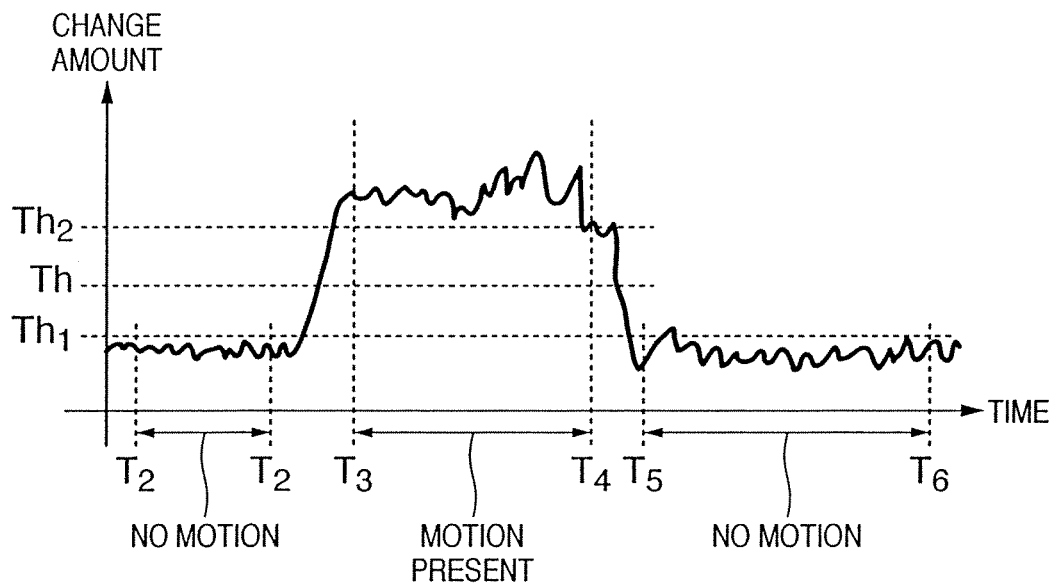
FIGS. 20A and 20B are graphs showing a change in change amount over time.

FIG. 20A is a graph showing a change in change amount over time. The abscissa represents time, and the ordinate represents a change amount. Times from T1 to T2 and from T5 to T6 without motion and time from T3 to T4 with motion are designated. The change amount largely changes between a state with motion and that without motion. Hence, a lower limit Th1 of an appropriate threshold value can be determined from the maximum value of the change amount during the period without motion, and an upper limit Th2 of the appropriate threshold value can be determined from the minimum value of the change amount during the period with motion. As a result, the user sets the appropriate threshold value Th between the lower limit Th1 and the upper limit Th2 of the threshold value.

The lower limit Th1 and upper limit Th2 of the appropriate threshold value can also be set by another method. FIG. 20B shows the detection error ratio and detection miss ratio when the threshold value is changed. A detection error means that a state without motion is erroneously discriminated as a state with motion. A detection error ratio curve 3021 is generated from the distribution of change amounts during the no motion detection times in FIG. 20A. When the threshold value is large, the detection error ratio is low. Detection miss means that a state with motion is erroneously as a state without motion. A detection miss ratio curve 3022 is generated from the distribution of change amounts during the motion detection times in FIG. 20A. When the threshold value is small, the detection miss ratio is low.

Figure 20B:
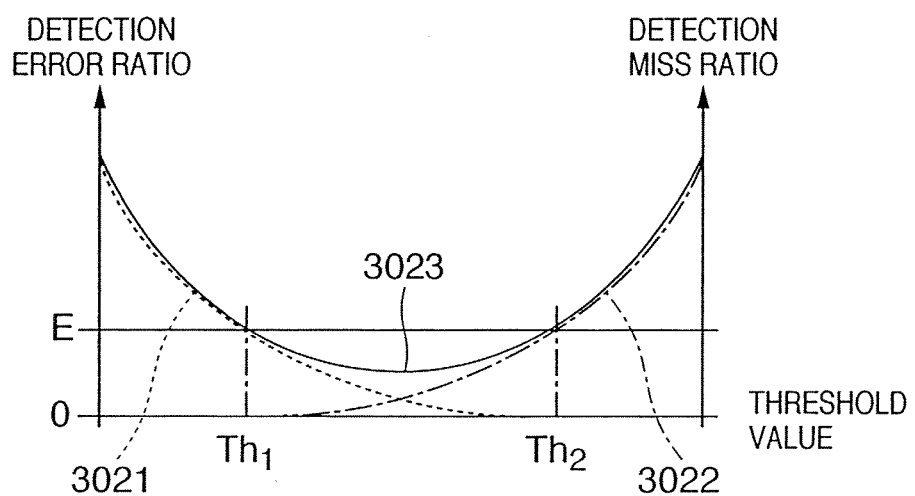

The sum of the detection error ratio and detection miss ratio indicates the total accuracy of detection, which is indicated by a detection ratio curve 3023 in FIG. 20B. As a consequence, the threshold value range to keep a predetermined discrimination accuracy E is the range from Th1 to Th2. According to this method, discrimination is possible even when the change amount distribution when "no motion" is designated and that when "motion present" is designated overlap.

Figure 21A:
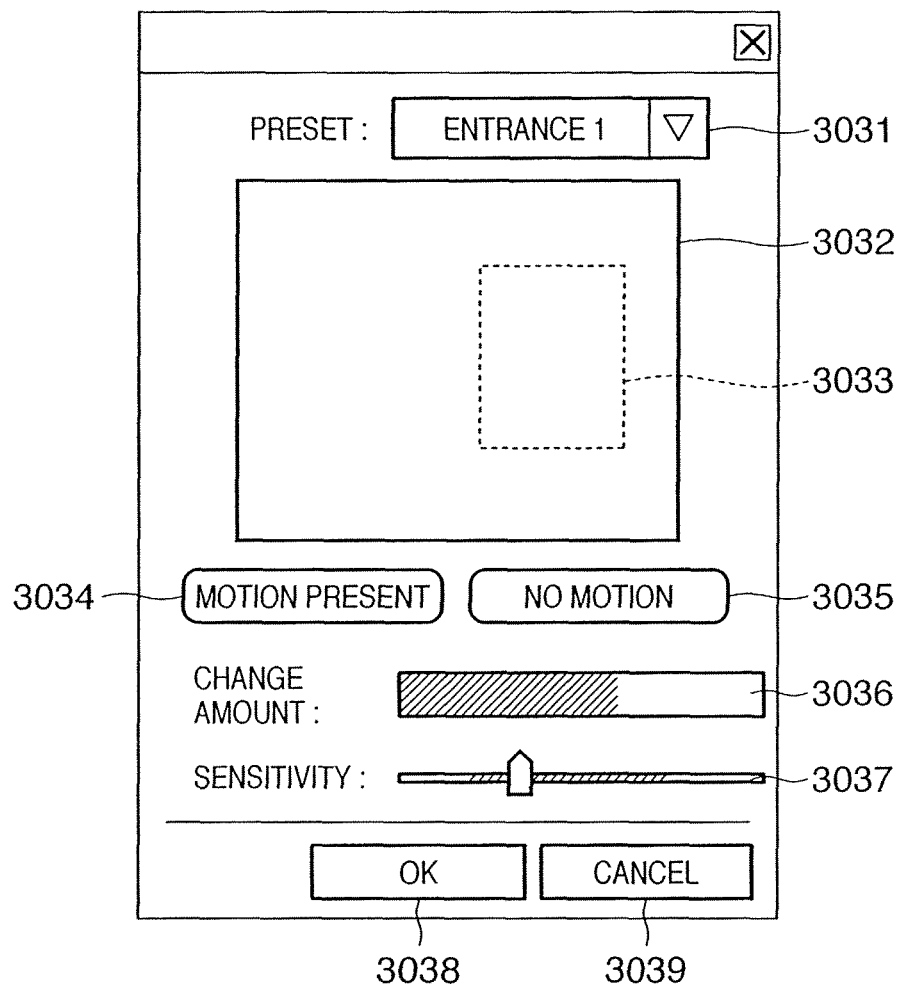
FIGS. 21A and 21B are views showing a GUI for motion detection sensitivity setting according to the eighth embodiment of the present invention.
Figure 21B:
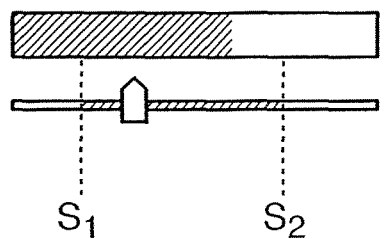

The GUI for motion detection sensitivity setting will be described next with reference to FIGS. 21A and 21B. FIG. 21A is a view showing an example of a dialog window for sensitivity setting. The dialog includes a preset selection portion 3031, image display portion 3032, detection target region setting frame 3033, "motion present" button 3034, "no motion" button 3035, change amount/discrimination result display portion 3036, sensitivity adjusting portion 3037, "OK" button 3038, and "cancel" button 3039.

The preset selection portion 3031 selects preset that designates pan, tilt, and zoom of a controllable camera. This designation is unnecessary for a stationary camera, as a matter of course. The motion detection target region 3033 is a frame which designates a region in an image to be subjected to difference processing. The position and size of this region can be changed by dragging the mouse cursor.

The "motion present" button 3034 and "no motion" button 3035 designate the start and end times of "motion present" state and "no motion" state. The buttons are set in a pressed state by one click and returned to the normal state by the second click. The start time is designated by clicking the button. The end time is designated by releasing the pressed state. After the designation, the data of "motion present" and "no motion" times are saved in the RAM or secondary storage device. When the pressed state of the "motion present" button is released to designate the end of the "motion present" state, the upper limit of the appropriate threshold value is calculated. When the pressed state of the "no motion" button is released to designate the end of the "no motion" state, the lower limit of the appropriate threshold value is set.

The change amount/discrimination result display portion 3036 displays change amounts as a graph and also displays the discrimination result of the presence/absence of motion by colors. The sensitivity adjusting portion 3037 converts the threshold value into sensitivity. The sensitivity can be set by dragging the knob of the slider. On the slider, the value range from minimum appropriate sensitivity S1 to maximum appropriate sensitivity S2 is highlighted, as shown in FIG. 21B. As already described above, the minimum value S1 of the appropriate sensitivity is obtained from the maximum value Th2 of the appropriate threshold value. The maximum value S2 of the appropriate sensitivity is obtained from the minimum value Th1 of the appropriate threshold value.

Figure 22B:
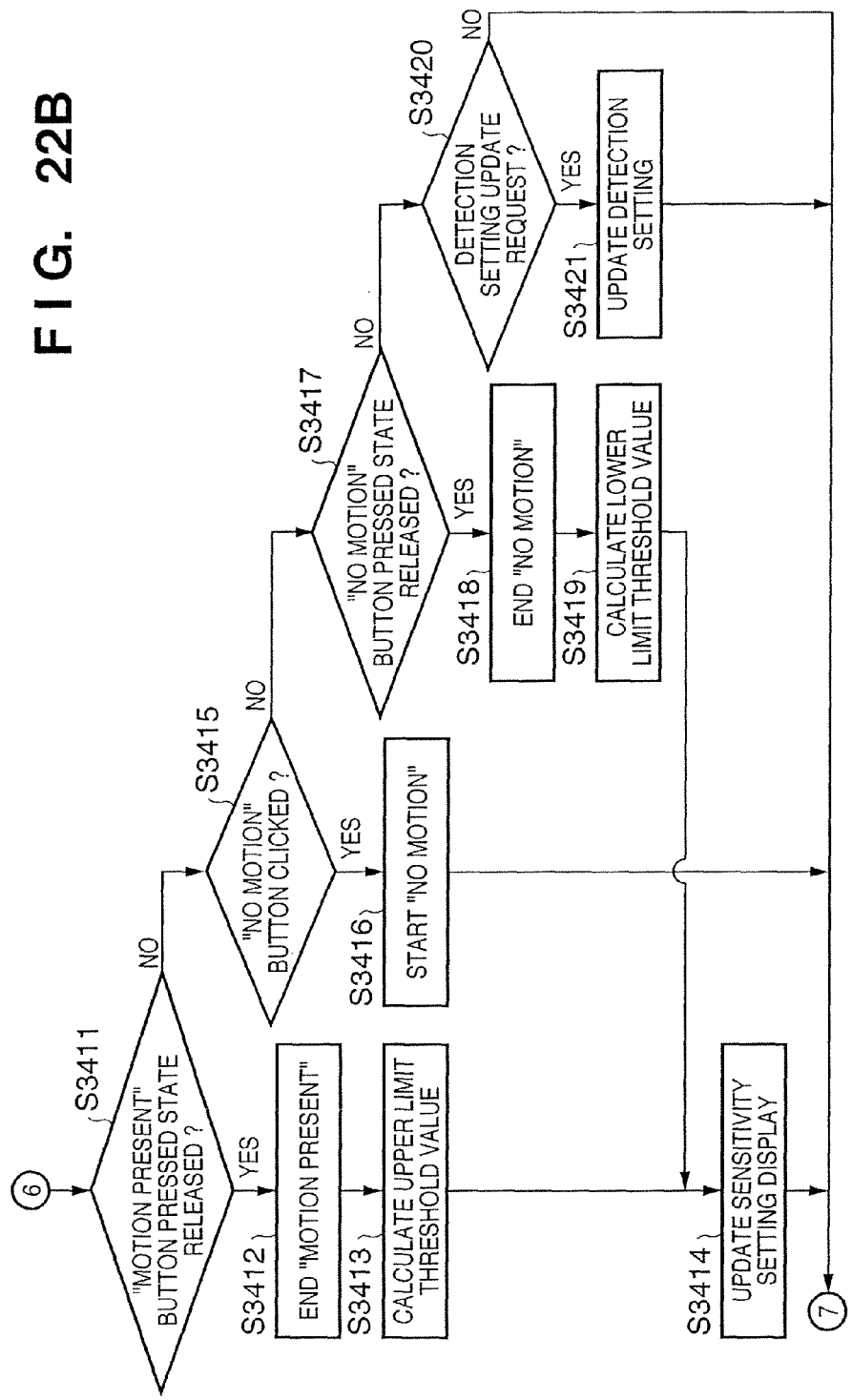
Figure 23:
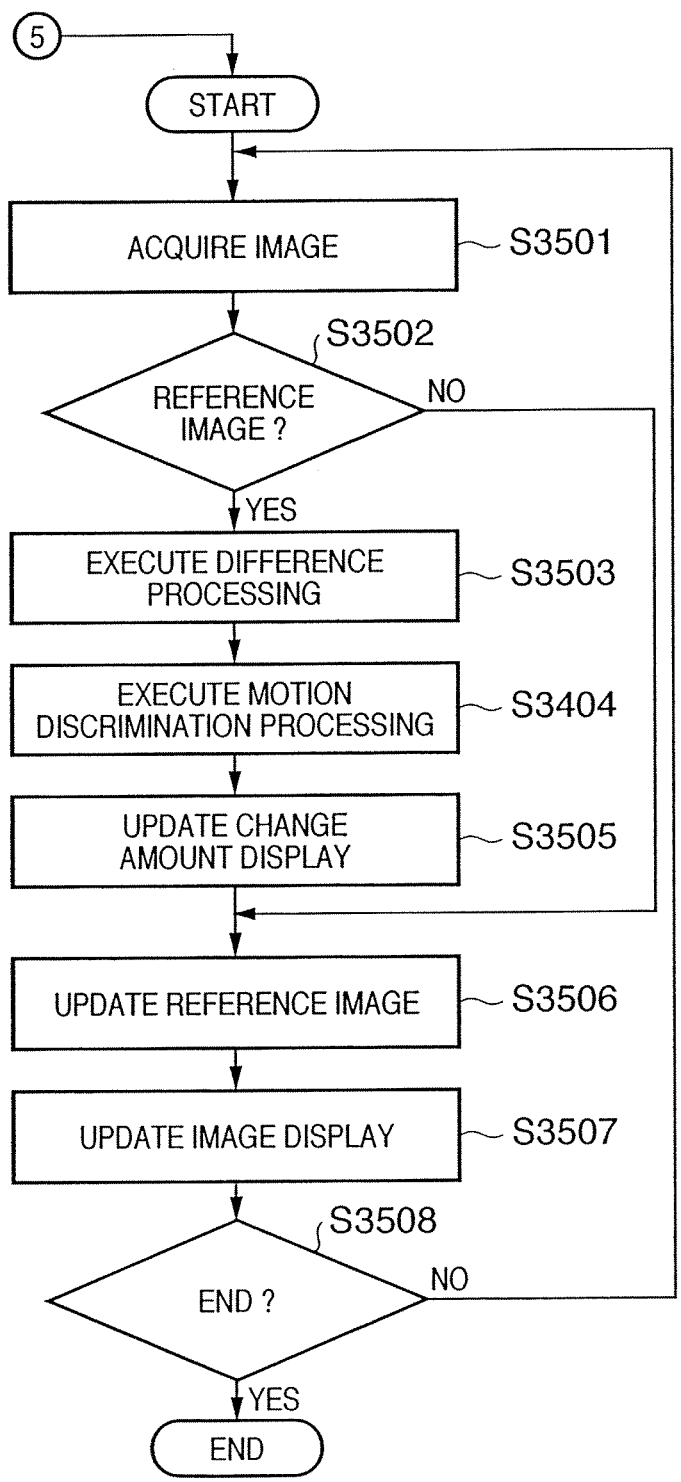
FIG. 23 is a flowchart showing the operation procedures of the motion detection setting program according to the eighth embodiment of the present invention.

The operation procedures of the motion detection setting program will be described next with reference to FIGS. 22A, 22B, and 23. FIGS. 22A and 22B show the operation procedures of the main process including the GUI. FIG. 23 shows the operation procedures of the sub process for executing motion detection processing.

In the main process shown in FIGS. 22A and 22B, after the start, initialization is executed in step S3401. In step S3402, the sub process is activated. When initialization is ended, a dialog as shown in FIG. 21A is displayed. In step S3403, an event is waited. Only major events relevant to the present invention will be described below.

When an event occurs, it is determined in step S3404 whether the event is preset input processing. This event occurs when the preset selection portion 3031 is changed. If YES in step S3404, the flow branches to Y. In step S3405, preset setting is executed. In step S3406, camera control is executed. Then, the flow returns to step S3403 to wait for the next event.

If NO in step S3404, the flow branches to N. In step S3407, it is determined, whether the event is a region change event. This event occurs when the motion detection target region frame 3033 is changed. If YES in step S3407, the flow branches to Y. The flow advances to step S3408 to execute region change processing. Then, the flow returns to step S3403 to wait for the next event.

If NO in step S3407, the flow branches to N. In step S3409, it is determined whether the event is a "motion present" button click event. If YES in step S3409, the flow branches to Y. In step S3410, the "motion present" start time is stored, and the flow returns to step S3403. If NO in step S3409, the flow branches to N. In step S3411, it is determined whether the event is a "motion present" button pressed state release event. If YES in step S3411, the flow branches to Y. The flow advances to step S3412 to store the "motion present" end time. In step S3413, the upper limit value of the appropriate threshold value is calculated. In step S3414, sensitivity setting display is updated. The flow returns to step S3403 to wait for the next event.

If NO in step S3411, the flow branches to N. The flow advances to step S3415 to determine whether the event is a "no motion" button click event. If YES in step S3415, the flow branches to Y. The flow advances to step S3416 to store the "no motion" start time, and the flow returns to step S3403. If NO in step S3415, the flow branches to N. The flow advances to step S3417 to determine whether the event is a "no motion" button pressed state release event. If YES in step S3417, the flow branches to Y. The flow advances to step S3418 to store the "no motion" end time. In step S3419, the lower limit value of the appropriate threshold value is calculated. Then, processing from step S3414 is executed.

If NO in step S3417, the flow advances to step S3420 to determine whether the event is a detection setting update request. This event occurs when the "OK" button 3038 is clicked. If YES in step S3420, the flow branches to Y. The flow advances to step S3421 to update the motion detection set value. Otherwise, the flow returns to step S3403 to wait for the next event.

The operation principle of the sub process for image processing will be described next with reference to FIG. 23. After the start, an image is acquired in step S3501. The image is input from the camera or acquired through the network. In step S3502, it is determined whether reference image necessary for difference processing is present.

As the reference image, at least one image in the past is used, as described above. If NO in step S3502, the flow branches to N. The flow advances to step S3506 to generate and update the reference image. For background difference, a "no motion" state is necessary for generating a reference image. This can be realized by adjusting the timing of setting. The timing can also be adjusted by adding, e.g., a "start setting" button to the setting dialog. This is not relevant to the present invention, and a description thereof will be omitted.

If YES in step S3502, the flow branches to Y. The flow advances to step S3503 to execute difference processing. In step S3504, motion discrimination processing is executed. In step S3505, change amount display update processing is executed. In step S3506, the reference image is updated. In step S3507, the window display is updated. In displaying the image, a region with a change may be highlighted. Finally, if no end instruction is input in step S3508, the flow branches to N. The flow returns to step S3501 to repeat the processing.

Program processing also includes processing executed when the "cancel" button 3039 is clicked. When setting is canceled, the set value is not determined, and the dialog is ended. A description of processing for events unique to the operating system will be omitted.

As is apparent from the above description, according to this embodiment, in motion detection based on the difference between images, the user designates the start and end times of a "motion present" state and those of a "no motion" state while observing images, thereby obtaining an appropriate threshold value range. In addition, since the upper and lower limits of the appropriate sensitivity value are displayed, the user can more easily set the threshold value and sensitivity.

Ninth Embodiment

As the ninth embodiment of the present invention, a method of setting an appropriate threshold value and sensitivity by inputting the times of "motion present" and "no motion" states of accumulated video images, as in the eighth embodiment, will be described. Since an over-time shift graph of change amounts is displayed together with the accumulated video images, the "motion present" and "no motion" periods can more conveniently be set.

Figure 24:
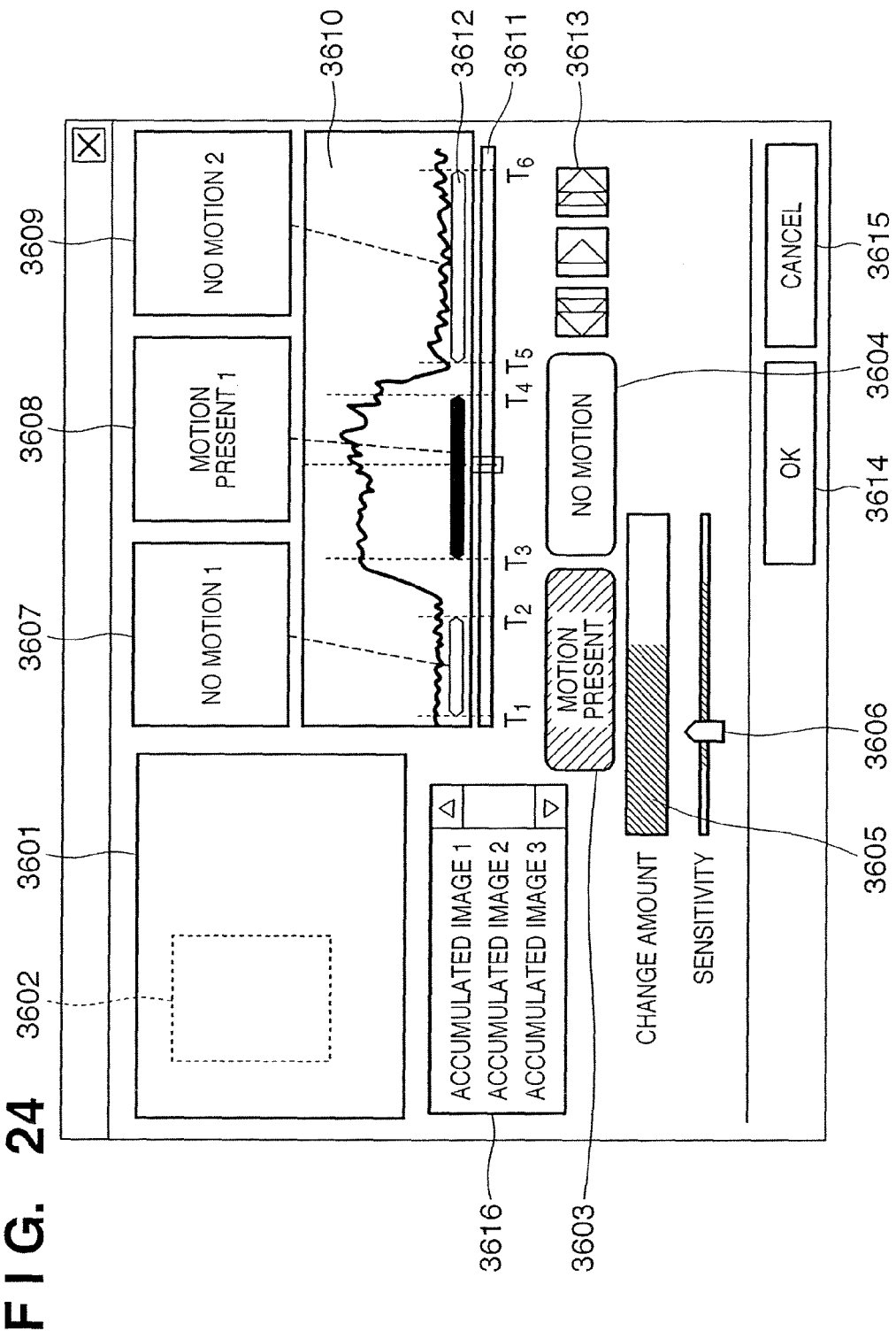
FIG. 24 is a view showing a GUI for motion detection sensitivity setting according to the ninth embodiment of the present invention.

The hardware and software configurations of this embodiment are the same as in the eighth embodiment, and a description thereof will be omitted. FIG. 24 shows an example of a GUI for sensitivity setting of this embodiment. FIG. 24 shows a dialog window which includes an image display portion 3601, motion detection target region setting portion 3602, accumulated video selection portion 3616, "motion present" button 3603, "no motion" button 3604, change amount/motion discrimination result display portion 3605, sensitivity adjusting portion 3606, representative image display portions 3607, 3608, and 3609, change amount shift graph 3610, motion time indication bar 3612, time indication bar 3611, playback control button group 3613, "OK" button 3614, and "cancel" button 3615. To store an accumulated video image on a live image window, a new button must be added independently of FIG. 24, though a description thereof will be omitted.

An operation method will be described next. First, an arbitrary video image is selected by the accumulated video selection portion 3616. The video image is displayed in the image display portion 3601, and playback starts. During playback, a change amount is displayed in the change amount display portion 3605. The position and size of the motion detection target region 3602 are changed by dragging the mouse, thereby designating the motion detection target region. When the playback button is clicked again during playback, playback is stopped.

When the "motion present" button 3603 and "no motion" button 3604 are operated at appropriate timings during playback, the start and end times of "motion present" and "no motion" states are designated, as in the eighth embodiment. In this embodiment, however, when the "motion present" button 3603 is clicked, display of the motion time indication bar 3612 is started in the change amount shift graph 3610. When the pressed state is released, the length of the bar is determined. The "motion present" state and the "no motion" state can be distinguished by the colors or patterns of the bar. The start and end times are also displayed on the time indication bar 3611. The above processing also applies to click of the "no motion" button 3604 and release of its pressed state.

When the motion time indication bar 3612 is determined, representative images during the period are displayed like 3607, 3608, and 3609 in correspondence with the indication of the bar. In detecting the "motion present" state, an image at a time with the maximum change amount can be used. Alternatively, images at the start of the "motion present" and "no motion" states may simply be used. In this embodiment, the representative images 3607, 3608. and 3609 corresponding to all the "no motion" and "motion present" periods are displayed. Instead, one of them may be displayed. The start and end times can be changed by dragging the motion period indication bar 3612 in the horizontal direction. In this embodiment, the motion period indication bars 3612 corresponding to all the "no motion" and "motion present" periods are displayed. Instead, one of them may be displayed. When the start and end times are changed, display of the sensitivity display portion 3606 and representative image display portions 3607 to 3609 is also updated.

The playback time can be changed by dragging the knob of the time indication bar 3611. With the playback control button group 3613, playback, fast-forward, and rewinding operations can be performed. These operations are the same as in general moving image playback software.

When the start and end times of the "motion present" and "no motion" states are determined, the lower and upper limits of the appropriate threshold value are determined and reflected on the highlighted portion of the sensitivity setting slider 3606. The algorithm for determining the appropriate threshold value range is the same as in the eighth embodiment. The operations of the change amount/discrimination result display portion 3605, sensitivity setting slider 3606, "OK" button 3614, and "cancel" button 3615 are also the same as in the eighth embodiment, and a description thereof will be omitted.

Figure 25:
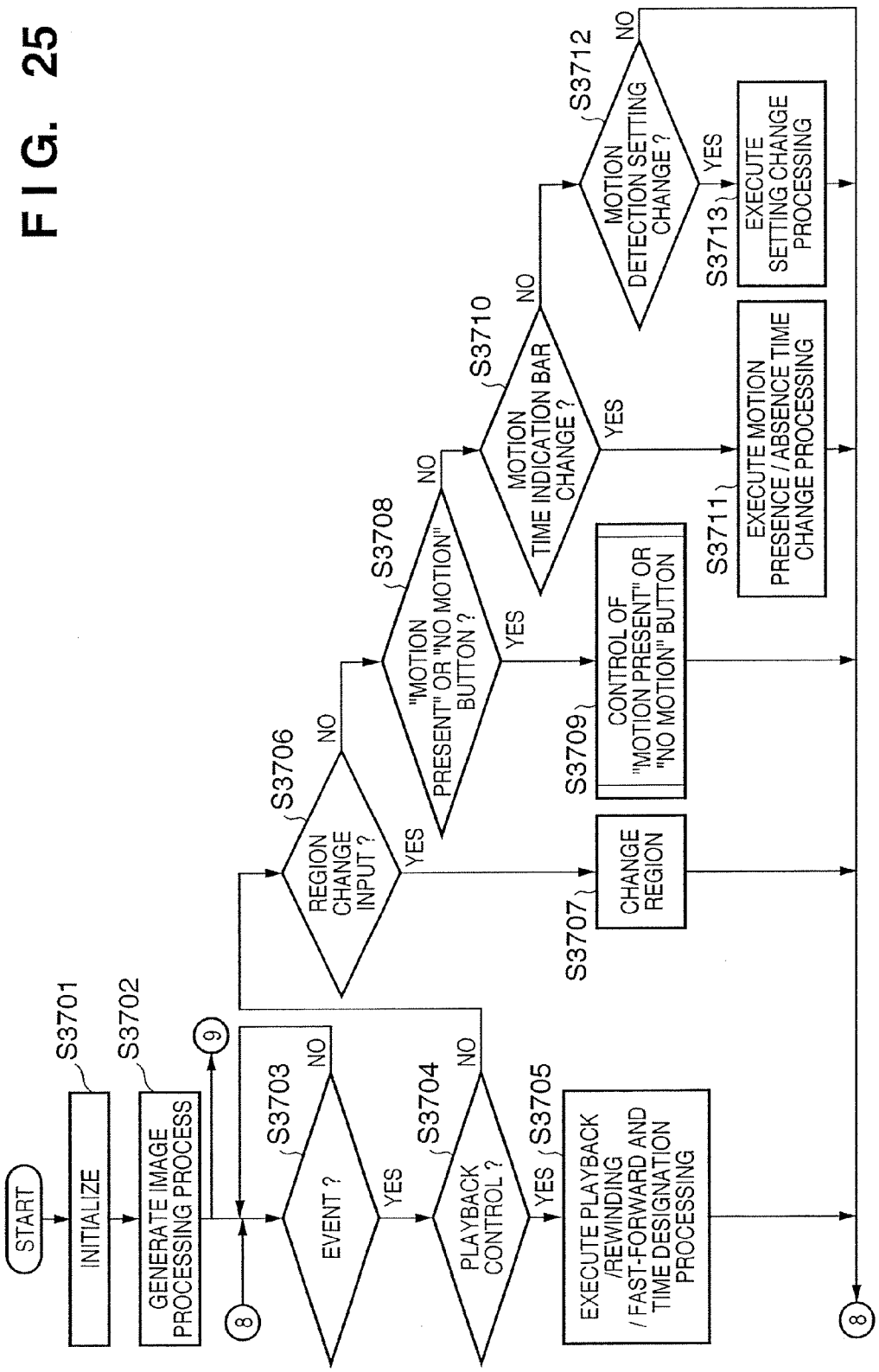
FIG. 25 is a flowchart showing the operation procedures of a motion detection sensitivity setting program according to the ninth embodiment of the present invention.

The operation procedures of the motion detection sensitivity setting program according to this embodiment will be described next with reference to FIGS. 25 and 26. FIG. 25 shows the operation procedures of the main process. The process composition of this embodiment is the same as that of the eighth embodiment, and the operation is also the same in many parts. Points different from the eighth embodiment will mainly be described below.

After the start, initialization is executed in step S3701. In step S3702, the image processing process is activated. In step S3703, an event is waited. When an event occurs, it is determined in step S3704 whether the event is a playback control event. This event occurs when the playback, fast-forward, or rewinding button 3613 or the time designation bar 3611 is operated. If YES in step S3704, the flow branches to Y. In step S3705, playback control processing is executed. Motion detection processing is not executed during fast-forward or rewinding.

If NO in step S3704, the flow branches to N. The flow advances to step S3706 to determine whether the event is a detection region change input. If YES in step S3706, the flow branches to Y. In step S3707, the position and size of the changed region are stored as detection region change processing.

If NO in step S3706, the flow branches to N. In step S3708, it is determined whether the event is an event related to the "motion present" or "no motion" button. The event processing (step S3708) and operation (step S3709) when the event has occurred are the same as the operation procedures of the first embodiment (steps S3409 to S3419) and therefore are not illustrated. As described above, when the start and end times are determined, display of the time indication bar 3611, motion time indication bar 3612, and representative image display portions 3607 to 3609 is updated. In addition, the appropriate threshold value range changes, and display of the sensitivity setting slider 3606 also changes.

If NO in step S3708, the flow branches to N. In step S3710, it is determined whether the event is motion time indication bar change event. This event occurs when the position and size of the motion time indication bar 3612 are changed by dragging it by the mouse. If YES in step S3710, motion time indication bar change processing is executed in step S3711. The position and size are converted into start and end times. When the start and end times are changed, display of the motion period indication bar 3612 and representative image display portions 3607 to 3609 is also changed in synchronism. In addition, the appropriate threshold value range changes, and display of the sensitivity setting slider 3606 also changes.

If NO in step S3710, the flow branches to N. The flow advances to step S3712 to determine whether the event is a motion detection setting change event. This event is the same as the processing in step S3420 in FIG. 22B of the eighth embodiment and occurs when the "OK" button 3614 is clicked. If YES in step S3712, the flow branches to Y. In step S3713, the motion detection set value is updated.

Figure 26:
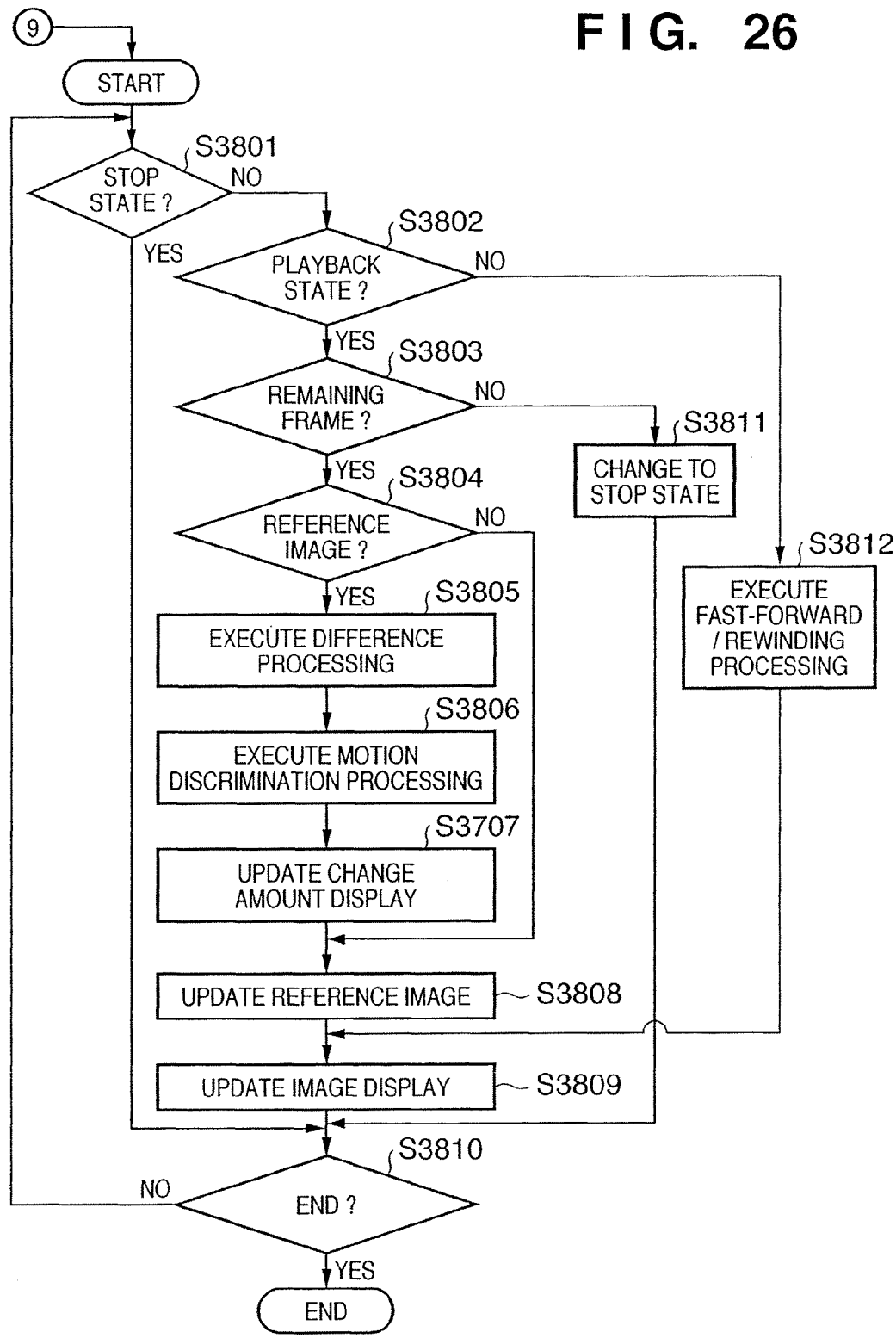
FIG. 26 is a flowchart showing the operation procedures of the motion detection sensitivity setting program according to the ninth embodiment of the present invention.

FIG. 26 shows the operation procedures of the sub process for image processing. The operation procedures include the same processing as in the sub process of the eighth embodiment. Points different from the eighth embodiment will mainly be described. After the start, it is determined in step S3801 whether a stop state is set. If YES in step S3801, the flow branches to Y. The flow advances to step S3810 to determine whether an end instruction event has occurred. If YES in step S3810, the flow branches to Y, and the processing is ended. Otherwise, the flow branches to N. The flow returns to step S3801 to continue the processing.

If NO in step S3801, the flow branches to N. It is determined in step S3802 whether a playback state is set. If YES in step S3802, the flow branches to Y. It is determined in step S3803 whether a frame remains. If YES in step S3803, the flow branches to Y to execute image difference processing from step S3804. Processing in steps S3804 to S3810 is the same as that in steps S3502 to S3508 in FIG. 23 of the eighth embodiment, and a description thereof will be omitted. When the processing is ended, the flow returns to step S3801.

If NO in step S3802, a fast-forward or rewinding state is set. Hence, the flow branches to N. The flow advances to step S3812 to execute fast-forward or rewinding processing. In step S3809, display is updated. The flow advances to step S3810 to execute end determination processing. If NO in step S3803, the flow advances to step S3811 to change the state to the stop state. Then, processing from step S3809 is executed.

According to this embodiment, the user inputs a period with motion and a period without motion while observing the playback images of accumulated images so that the ranges of the appropriate threshold value and sensitivity are automatically calculated. In addition, since the over-time shift of the change amount is displayed as a graph, and the start and end times of the "motion present" and "no motion" states are graphically displayed, the "motion present" and "no motion" periods can easily be set.

10th Embodiment

As the 10th embodiment of the present invention, a method of automatically setting the motion detection target region on an image on the basis of the change amount distribution during the "motion present" period in the eighth embodiment will be described.

Figure 27:
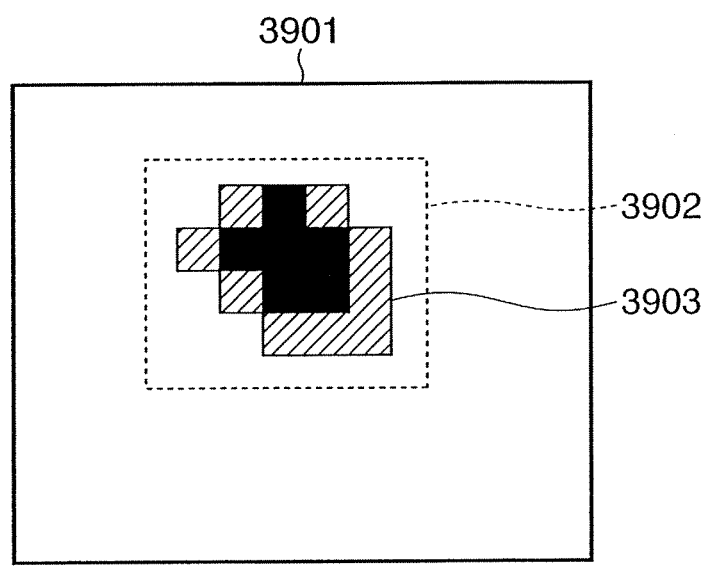
FIG. 27 is a view for explaining a method of automatically setting a motion detection target region according to the 10th embodiment of the present invention.
Figure 28:
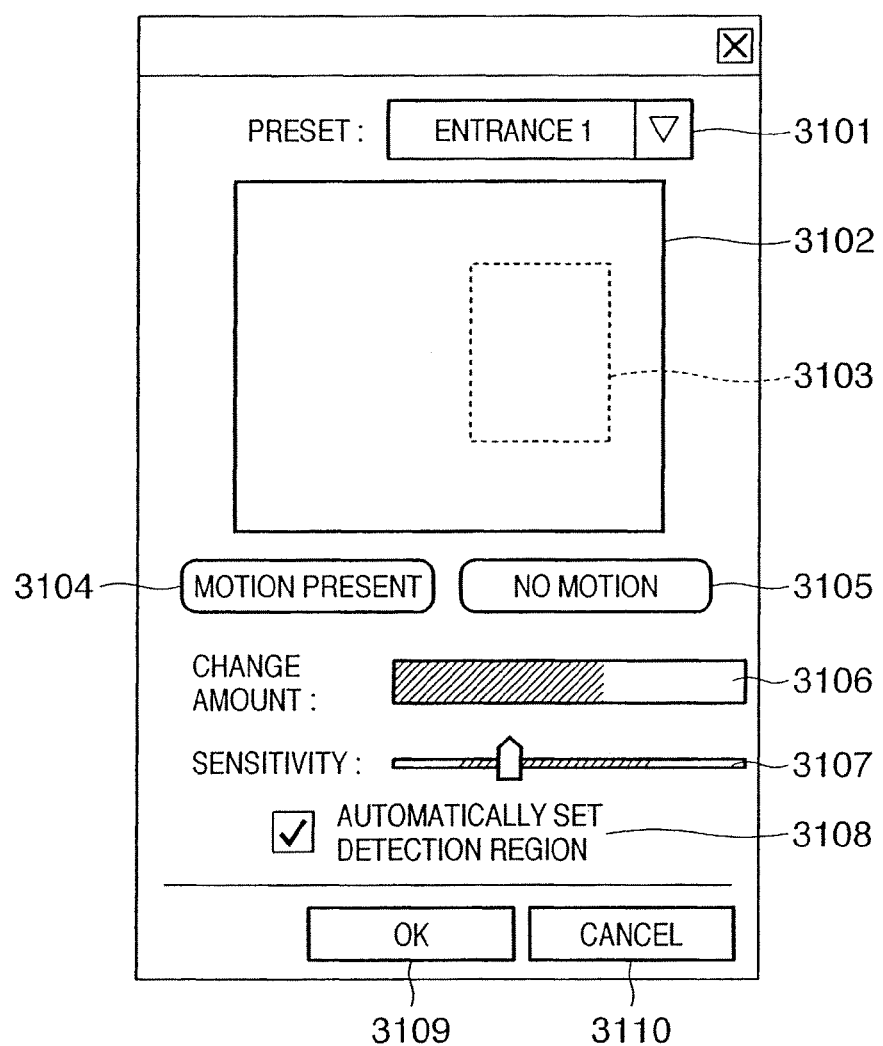
FIG. 28 is a view showing a GUI for motion detection setting according to the 10th embodiment of the present invention.

The automatic motion detection target region setting method according to this embodiment will be described with reference to FIG. 27. Referring to FIG. 27, the sum of change amounts during the "motion present" period is displayed for each partial region on an image 3901. A region with large motion is displayed in a dark color. This is a histogram in the direction of time. When a partial region having a sum equal to or more than a predetermined value is extracted, and a circumscribed rectangle 3902 is obtained, a motion detection target region can be set.

For the GUI of motion detection setting in this embodiment, a check box 3108 to instruct automatic setting of the motion detection region is added to the setting GUI (FIG. 21) of the eighth embodiment. The detection target region is determined by the above-described algorithm at a timing when the pressed state of the "motion present" button is released.

The operation procedures of the program of this embodiment are the same as in the eighth embodiment except the processing for obtaining the detection target region by the above-described method is added to the "motion present" state end processing in step S3412 of the processing procedures of the main process, and a description thereof will be omitted.

In the above description, the processing is added to the eighth embodiment. Instead, the function of automatically setting the detection target region may be added to the ninth embodiment by the same method as described above.

According to this embodiment, in motion detection based on the difference between images, the user designates the "motion present" period. The detection target region can automatically be set from the statistics of the change amounts during the "motion present" period. Accordingly, the motion detection target region setting processing can be simplified.

As described above, according to this embodiment, in the motion detection method of detecting motion in an image on the basis of a change amount obtained from the difference between images, the user designates the "motion present" and "no motion" periods so that motion detection setting to calculate an appropriate threshold value and present an appropriate sensitivity range to the user can be executed. An appropriate sensitivity range can be presented not only for a live image but also for an accumulated image. In addition, a motion detection setting method of designating the "motion present" period and automatically designating the motion detection target region from the statistics of change amounts during the period is provided.

11th Embodiment

As the 11th embodiment of the present invention, a method will be described, in which when the start of automatic sensitivity setting is instructed when an image has no motion, optimum sensitivity is automatically set from the statistics of difference values for several sec.

Figure 29:
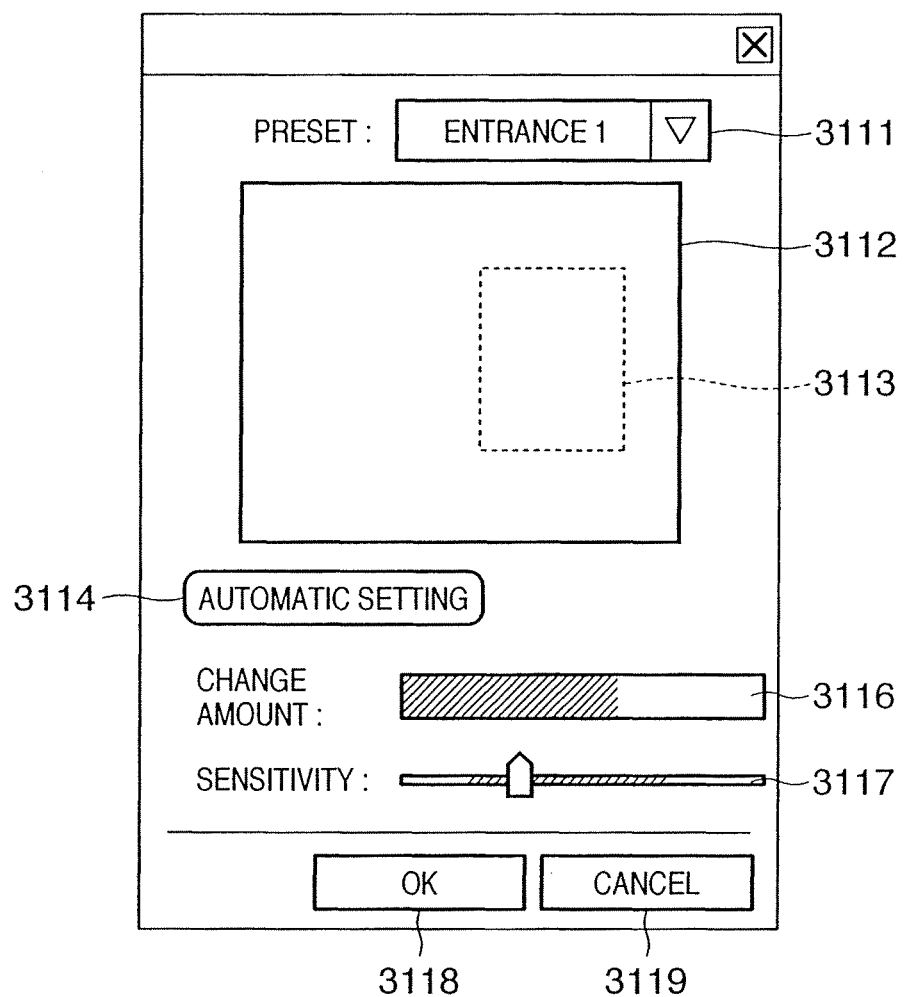
FIG. 29 is a view showing a GUI for motion detection setting according to the 11th embodiment of the present invention.

The hardware and software configurations of this embodiment are the same as in the eighth embodiment, and a description thereof will be omitted. FIG. 29 shows an example of a sensitivity setting window according to this embodiment. The 11th embodiment is different from the eighth embodiment in that the "motion present" button 3034 and "no motion" button 3035 are omitted, and an automatic setting button 3114 is arranged instead. In addition, since sensitivity is automatically set in this embodiment, a sensitivity setting slider 3117 indicates no upper and lower limits of sensitivity, unlike the sensitivity setting slider 3037. When the automatic setting button 3114 is clicked in a "no motion" state, automatic sensitivity setting starts.

The procedures of automatic sensitivity setting will be described with reference to FIG. 30. FIG. 30 shows the operation procedures related to automatic sensitivity setting of a motion detection setting program. The user confirms that no motion is present on the screen and clicks the automatic setting button 3114. A "no motion" state is a state in which no motion to be detected is present. Motion other than a detection target, such as swaying trees or waving water surface, poses no problem.

After the start of motion detection setting, an attempt to acquire an image is made in step S3201. In this embodiment, assume that the reference image described in the eighth embodiment has already been acquired. If NO in step S3202, the flow branches to N. The flow advances to step S3203 to determine whether the attempt has continuously failed. The number of continuous failures has an upper limit. If the number is equal to or smaller than the upper limit, the flow branches to N. The flow returns to step S3201 to execute image acquisition again. If the number of continuous failures exceeds the upper limit, the flow branches to Y. The flow advances to step S3204 to display a failure message, and the automatic setting is ended. In this case, the sensitivity value remains the value before the start of automatic setting.

If YES in step S3202, the flow branches to Y. In step S3205, difference processing is executed. As described in the eighth embodiment, this embodiment does not depend on difference processing. For example, in continuous frames, the sum of difference for DCT coefficients after quantization is obtained for a JPEG block having 8×8 pixels of a detection region 3113 and used as the difference value. Continuous frames mean, e.g., a current frame and an immediately preceding frame.

Next, in step S3206, an average difference value Dt (t= 1, ..., n) in the acquired frames is calculated. Since exceptional values are excluded in obtaining the average, about 10% values on the upper and lower sides of the difference values are excluded. In step S3207, it is determined whether the minimum acquisition time has elapsed. The minimum acquisition time is fixed to, e.g., 2 sec. If NO in step S3207, the flow branches to N. The flow returns to step S3201 to continue image acquisition and difference processing.

If YES in step S3207, the flow branches to Y. The flow advances to step S3208 to determine whether the number of acquired frames is equal to or more than the minimum number of frames. This processing is done to calculate the final average difference value by using the average difference value of, e.g., at least five frames to obtain a statistically significant value.

If NO in step S3208, the flow branches to N. It is determined in step S3209 whether the maximum acquisition time has elapsed. The maximum acquisition time is set to, e.g., 10 sec. If YES in step S3209, the flow branches to Y. In step S2304, a failure message is displayed, and the processing is ended. This situation occurs when, e.g., five frames cannot be obtained even after 10-sec wait. If NO in step S3209, the flow branches to N. The flow returns to step S3201 to continue image acquisition and difference processing.

If YES in step S3208, the flow branches to Y. In step S3210, average difference value calculation for all frames is executed. At this time, an average D of the average difference values Dt of the frames is obtained. In this case as well, for example, when 10% values on the upper and lower sides are excluded, noise can be removed. In step S3211, sensitivity is obtained from the difference value. At this time, sensitivity S which is inversely proportional to the average difference value D is obtained by using the same equation as in the eighth embodiment.

$$S=a(D\max-D)+b$$

where
S: sensitivity, Dmax: maximum difference value,
D: average difference value, and a, b: constants In this equation, the constant b acts to reduce the sensitivity and normally takes a negative value. After sensitivity calculation, a message representing that automatic sensitivity setting has successfully be done is displayed in step S3212. In step S3213, the sensitivity is updated to the new value, and the processing is ended.

This scheme can be applied not only to a stationary camera but also to a controllable camera capable of pan, tilt, and zoom control. However, if camera control which influences images is executed in such a camera during automatic sensitivity setting, automatic sensitivity setting fails. Such camera control includes, e.g., pan, tilt, zoom, focus, gain, exposure, aperture, shutter speed, and white balance.

In this embodiment, only the start of automatic sensitivity setting is designated. This assumes that no motion is present in the screen during automatic sensitivity setting. For this reason, if unexpected large motion continuously occurs in the screen, this motion cannot always be removed as noise. Hence, it may be impossible to set a correct value. However, when a stable "no motion" is set for several sec, sensitivity can automatically be obtained from the difference amount during that time.

Other Embodiments

In each of embodiments described above, for change and motion detection, whether the change amount of image data is less than a predetermined value is detected. However, the present invention is not limited in this way. For example, the detection can be based on whether the change amount of image data exceeds a predetermined value, and when the change amount exceeds the predetermined value, then the next processing and control (notification processing, storing the image data, and etc) can be executed.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to at least one of the above mentioned flowcharts (FIGS. 7-9, 15, 22A, 22B, 23, 25, 26 and FIG. 30) is to be stored in the storage medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Applications No. 2003-311340 filed on Sep. 3, 2003, No. 2003-371039 filed on Oct. 30, 2003, No. 2003-415428 filed on Dec. 12, 2003, and No. 2004-141239 filed on May 11, 2004, which are hereby incorporated by reference herein.

What is claimed is:

1. An apparatus comprising:
  a receiving unit configured to receive images captured by a capturing unit; and
  an acquiring unit configured to acquire a degree of change in a first image of the images captured by the capturing unit based on a difference between the first image captured by the capturing unit and a second image which is generated based on a plurality of images captured by the capturing unit before the first image is captured by the capturing unit; and
  a display control unit configured to cause a display unit to display the first image received by the receiving unit and to display a graph which indicates the degree of change in the first image.

2. The apparatus according to claim 1, further comprising a determination unit configured to determine a parameter for detecting a moving object.

3. The apparatus according to claim 1, wherein the display control unit is configured to cause the display unit to display the graph which indicates a chronological degree of change in the images captured by the capturing unit.

4. The apparatus according to claim 1, wherein the graph indicates a degree of a motion of an object in the first image.

5. The apparatus according to claim 1, wherein the display control unit is configured to cause the display unit to display, together with the graph which indicates the degree of change in the first image, a graphical user interface for setting a parameter used to detect a moving object in the first image.

6. The apparatus according to claim 1, wherein the degree of change is determined based on at least one of RGB components or YCbCr components of pixels, a lightness of pixels, code amounts of JPEG coded blocks, or DCT coefficients in a JPEG coded block of the first image.

7. The apparatus according to claim 1, wherein the display control unit is configured to cause the display unit to display the graph based on a histogram about the images captured by the capturing unit.

8. The apparatus according to claim 1, wherein the display control unit is configured to cause the display unit to display the graph together with the images captured by the capturing unit.

9. The apparatus according to claim 1, wherein the receiving unit is configured to receive the images from the capturing unit via a network.

10. A system comprising:
  a receiving unit configured to receive images captured by a capturing unit;
  an acquiring unit configured to acquire a degree of change in a first image of the images captured by the capturing unit based on a difference between the first image captured by the capturing unit and a second image which is generated based on a plurality of images captured by the capturing unit before the first image is captured by the capturing unit; and
  a display control unit configured to cause a display unit to display the first image received by the receiving unit and to display a graph which indicates the degree of change in the first image.

11. The system according to claim 10, wherein the display control unit is configured to cause the display unit to display the graph which indicates a chronological degree of change in the images by the capturing unit.

12. A method comprising:
  receiving images captured by a capturing unit; and
  acquiring a degree of change in a first image of the images captured by the capturing unit based on a difference between the first image captured by the capturing unit and a second image which is generated based on a plurality of images captured by the capturing unit before the first image is captured by the capturing unit; and causing a display unit to display the first image received in the receiving step and to display a graph which indicates the degree of change in the first image.

13. A non-transitory computer-readable storage medium storing a program comprising:

computer-executable instructions for instructing a computer to receive images captured by a capturing unit; and computer-executable instructions for instructing a computer to acquire a degree of change in a first image of the images captured by the capturing unit based on a difference between the first image captured by the capturing unit and a second image which is generated based on a plurality of images captured by the capturing unit before the first image is captured by the capturing unit; and computer-executable instructions for instructing a computer to cause a display unit to display the first image and to display a graph which indicates the degree of change in the first image.

14. The non-transitory computer-readable storage medium according to claim 13, further comprising:

computer-executable instructions for instructing the computer to cause the display unit to display the graph which indicates a chronological degree of change in the images captured by the capturing unit.

15. An apparatus comprising:

a receiving unit configured to receive images captured by a capturing unit; and a display control unit configured to cause a display unit to display a first image of the images captured by the receiving unit and to display a graph which indicates a degree of change in the first image, wherein the display control unit is configured to cause the display unit to display, together with the graph which indicates the degree of change in the first image, a slide bar for setting a threshold used to detect a moving object in the first image.

16. The method according to claim 12, wherein the controlling step causes the display unit to display the graph which indicates a chronological degree of change in the images captured by the capturing unit.

17. An apparatus comprising:

a receiving unit configured to receive images captured by a capturing unit;

an acquiring unit configured to acquire a degree of change based on the difference between a first image captured by the capturing unit and a second image; and a display control unit configured to cause a display unit to display the images received by the receiving unit and to display a graph which indicates the degree of change in the first image, wherein the acquiring unit is configured to acquire the degree of change in the first image based on values of coding coefficient differences in a first coded block of the first image and a second coded block of the second image, the second coded block corresponding to the first coded block.

18. The apparatus according to claim 17, wherein the acquiring unit is configured to acquire the degree of change in the first image based on values of DCT coefficient differences in a first JPEG coded block of the first image and a second JPEG coded block of the second image.

19. The apparatus according to claim 17, wherein the acquiring unit is configured to acquire the degree of change based on a change in the first image that occurred based on a ratio of a total area of coded blocks in which changes have been detected to an area of the part of the first image.

20. A method comprising:

receiving images captured by a capturing unit;

acquiring a degree of change based on the difference between a first captured image and a second image; and causing a display unit to display the images received by the receiving unit and to display a graph which indicates the degree of change in the first image, wherein the acquiring step acquires the degree of change in the first image based on values of coding coefficient differences in a first coded block of a first image and a second coded block of the second image, the second coded block corresponding to the first coded block.

* * * * *